US012701549B2

(12) United States Patent
Nagano et al.

(10) Patent No.: US 12,701,549 B2
(45) Date of Patent: Aug. 4, 2026

(54) TERMINAL AND WIRELESS COMMUNICATION METHOD

(71) Applicants: DENSO CORPORATION, Kariya (JP); TOYOTA JIDOSHA KABUSHIKI KAISHA, Toyota (JP)

(72) Inventors: Tatsuki Nagano, Kariya (JP); Hideaki Takahashi, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 18/502,944

(22) Filed: Nov. 6, 2023

(65) Prior Publication Data

US 2024/0073864 A1     Feb. 29, 2024

Related U.S. Application Data

(63) Continuation of application No. PCT/JP2022/019480, filed on May 2, 2022.

(30) Foreign Application Priority Data

May 7, 2021     (JP) ................................. 2021-079341

(51) Int. Cl.
H04W 68/02     (2009.01)
H04W 68/00     (2009.01)
H04W 72/232     (2023.01)

(52) U.S. Cl.
CPC ......... H04W 68/02 (2013.01); H04W 68/005 (2013.01); H04W 72/232 (2023.01)

(58) Field of Classification Search
CPC . H04W 68/02; H04W 68/025; H04W 72/232; H04W 68/005; H04W 4/14;

(Continued)

(56) References Cited

U.S. PATENT DOCUMENTS

| | | | | |
|---|---|---|---|---|
| 2022/0159669 A1* | 5/2022 | Kim | ................. | H04W 52/0229 |
| 2022/0312369 A1* | 9/2022 | He | ........................ | H04W 68/02 |
| 2022/0330201 A1* | 10/2022 | Hwang | ............. | H04W 72/1273 |
| 2023/0015708 A1* | 1/2023 | Gurumoorthy | ..... | H04W 68/025 |

FOREIGN PATENT DOCUMENTS

| | | | | | |
|---|---|---|---|---|---|
| CN | 114071710 B | * | 8/2024 | ........ | H04W 52/0209 |
| WO | WO-2022213868 A1 | * | 10/2022 | ........ | H04W 52/0229 |

OTHER PUBLICATIONS

U.S. Appl. No. 18/502,604, filed Nov. 6, 2023, Tatsuki Nagano.

(Continued)

*Primary Examiner* — Hirdepal Singh
(74) *Attorney, Agent, or Firm* — Harness, Dickey & Pierce, P.L.C.

(57)     ABSTRACT

A terminal includes: a receiving unit which receives, from a core network device, an identifier of a subgroup of a paging occasion to which the terminal belongs, and which receives, from a base station, system information including information for indicating a total number of subgroups of the paging occasion and information for indicating a number of paging occasions corresponding to one Paging Early Indication (PEI) monitoring occasion; and a control unit which performs monitoring of a physical downlink control channel (PDCCH) for first downlink control information (DCI) including a field of a PEI in the PEI monitoring occasion, wherein the control unit performs monitoring of a PDCCH for second DCI in the paging occasion in a case where a value of the PEI indicates the subgroup of the paging occasion to which the terminal belongs; and performs no monitoring of the PDCCH for the second DCI in the paging occasion in a case where the PEI is not detected, or a value of the PEI does not indicate the subgroup of the paging occasion to which the terminal belongs, and a number of bits for the field of the PEI is determined based on the information for indicating the total number of subgroups of the paging occasion and the information for indicating the (Continued)

number of paging occasions corresponding to the one PEI monitoring occasion.

4 Claims, 15 Drawing Sheets

(58) Field of Classification Search
CPC ......... H04W 52/0216; H04W 52/0219; H04W 52/0229; H04W 52/0235; H04W 52/028; H04L 5/0053
USPC ........................................................ 455/458
See application file for complete search history.

(56) References Cited

OTHER PUBLICATIONS

U.S. Appl. No. 18/502,665, filed Nov. 6, 2023, Tatsuki Nagano.
U.S. Appl. No. 18/502,877, filed Nov. 6, 2023, Tatsuki Nagano.
3GPP TS 38.300 V15.2.0 (Jun. 2018), 3rd Generation Partnership Project; Technical Specification Group Radio Access Network; NR; NR and NG-RAN Overall Description; Stage 2 (Release 15), pp. 1-87.
LG Electronics, Discussion on potential paging enhancements [online], 3GPP TSG RAN WGI #104b-e R1-2103355, Apr. 7, 2021, Apr. 12-20, 2021, pp. 1-6.
OMCC, Discussion on paging early indication design[online], 3GPP TSG RAN WG1 #104b-e R1-2102892, Apr. 6, 2020, Apr. 12-20, 2021, pp. 1-5.
Qualcomm Inc., "UE Subgroup for Paging Reception", Document R2-2102680, 3GPP TSG-RAN WG2 Meeting #113bis-e, Apr. 12-20, 2021.
Mediatek (as moderator), "Summary of Paging Enhancements", Document R1-2103848, 3GPP TSG RAN WG1 e-Meeting #104-bis-e, Apr. 12-20, 2021.
Huawei et al., "Wake-Up Signal in NB-IoT and eMTC", Document R2-1805082, 3GPP TSG RAN WG2 Meeting #101bis, Apr. 16-20, 2018.

* cited by examiner

30 CORE NETWORK

20 BASE STATION

C

UL SIGNAL

DL SIGNAL

| PO INDICATION FIELD | PO |
|---|---|
| 00 | PO#0 |
| 01 | PO#1 |
| 10 | PO#2 |
| 11 | PO#3 |

| SUBGROUP INDICATION FIELD | SUBGROUP |
|---|---|
| 0000 | SUBGROUP #0 |
| 0001 | SUBGROUP #1 |
| 0010 | SUBGROUP #2 |
| ... | ... |
| 1111 | SUBGROUP#15 |

Fig. 10

| TOTAL NUMBER OF SUBGROUPS ($N_{sg}$) | SUBGROUP ASSIGNED TO TERMINAL 10 |
|---|---|
| 2 | SUBGROUP #1 |
| 3 | SUBGROUP #3 |
| 4 | SUBGROUP #0 |
| ... | ... |
| 16 | SUBGROUP #12 |

Fig. 12

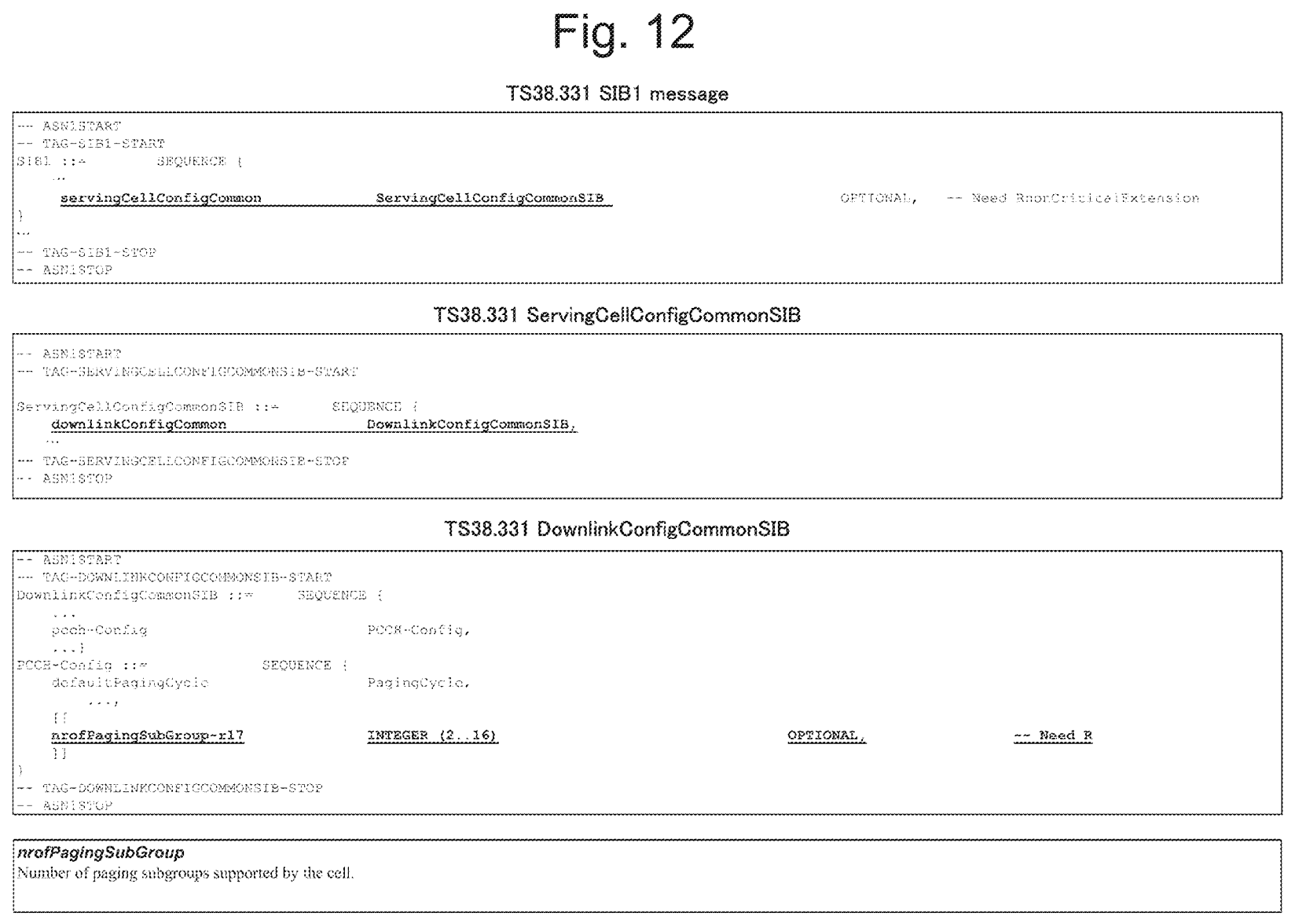

TS38.331 SIB1 message

```
-- ASN1START
-- TAG-SIB1-START
SIB1 ::=        SEQUENCE {
    ...
    servingCellConfigCommon        ServingCellConfigCommonSIB        OPTIONAL,  -- Need RnonCriticalExtension
}
-- ...
-- TAG-SIB1-STOP
-- ASN1STOP
```

TS38.331 ServingCellConfigCommonSIB

```
-- ASN1START
-- TAG-SERVINGCELLCONFIGCOMMONSIB-START
ServingCellConfigCommonSIB ::=        SEQUENCE {
    downlinkConfigCommon        DownlinkConfigCommonSIB,
    ...
}
-- TAG-SERVINGCELLCONFIGCOMMONSIB-STOP
-- ASN1STOP
```

TS38.331 DownlinkConfigCommonSIB

```
-- ASN1START
-- TAG-DOWNLINKCONFIGCOMMONSIB-START
DownlinkConfigCommonSIB ::=        SEQUENCE {
    ...
    pcch-Config        PCCH-Config,
    ...
}
PCCH-Config ::=        SEQUENCE {
    defaultPagingCycle        PagingCycle,
    ...,
    [[
    nrofPagingSubGroup-r17        INTEGER (2..16)        OPTIONAL,  -- Need R
    ]]
}
-- TAG-DOWNLINKCONFIGCOMMONSIB-STOP
-- ASN1STOP
```

*nrofPagingSubGroup*
Number of paging subgroups supported by the cell.

13 COMMUNICATION DEVICE

14 INPUT/OUTPUT DEVICE

11 PROCESSOR

12 STORAGE DEVICE

201 RECEIVING UNIT

202 TRANSMITTING UNIT

203 CONTROL UNIT

TERMINAL AND WIRELESS COMMUNICATION METHOD

CROSS-REFERENCE TO RELATED APPLICATIONS

This application is a continuation application of International Patent Application No. PCT/JP2022/019480, filed May 2, 2022, which designated the U.S. and claims the benefit of priority to Japanese Patent Application No. 2021-079341, filed May 7, 2021. The entire disclosures of the above applications are incorporated herein by reference.

TECHNICAL FIELD

This disclosure relates to a terminal and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT (for example, Non-Patent Document 1: 3GPP TS 38.300 V15.2.0 (2018 June). LTE and/or LTE-Advanced are also called Evolved Universal Terrestrial Radio Access (E-UTRA).

In E-UTRA and/or NR, a network-initiated connection is set up by paging. For example, in NR, a terminal in an idle state or an inactive state monitors Downlink Control Information (DCI) transferred by use of a downlink control channel (for example, Physical Downlink Control Channel: PDCCH) in a period for paging (hereinafter referred to as a "paging period"). The terminal receives a paging message through a downlink shared channel (for example, a physical downlink control channel (Physical Downlink Shared Channel: PDSCH) scheduled by the DCI. The terminal reduces electric power to be consumed by the terminal by performing discontinuous reception (DRX) in which the terminal sleeps outside the paging period.

SUMMARY

In the 3GPP (for example, NR Release 17), it is considered to divide a plurality of terminals assigned to the same paging period into given units (hereinafter referred to as "subgroups") and perform paging per subgroup (hereinafter referred to as "subgrouping"). Further, it is expected to improve a power-saving effect by subgrouping by indicating in advance, for the terminal 10, a subgroup targeted for paging in a paging period (hereinafter referred to as "paging early indication (PEI)").

In the meantime, DCI monitored in a paging period is assumed to be used not only for scheduling of a downlink shared channel (for example, PDSCH) for transmitting a paging message but also for transmission of a short message. The short message is also used, for example, notification of modification of system information or public warning such as Earthquake and Tsunami Warning System (ETWS) or Commercial Mobile Alert System (CMAS). Accordingly, in a case where subgrouping of paging using PEI is performed, how a terminal operation in a paging period is controlled, e.g., monitoring of DCI or the like, becomes a problem.

One object of this disclosure is to provide a terminal and a wireless communication method each of which is able to perform a suitable operation in a paging period for subgrouping of paging using PEI.

A terminal according to one aspect of this disclosure includes: a receiving unit which receives configuration information about reception of information or a signal indicative of a subgroup targeted for paging in a period for paging; and a control unit which controls reception of the information or the signal. The control unit performs monitoring of downlink control information in which a Cyclic Redundancy Check (CRC) bit is scrambled by specific Radio Network Temporary Identifier (RNTI) in the period, regardless of the subgroup indicated by the information or the signal.

With one aspect of this disclosure, it is possible to perform a suitable operation in a paging period for subgrouping of paging using PEI.

BRIEF DESCRIPTION OF DRAWINGS

FIG. 1 is a diagram illustrating an example of the overview of a wireless communication system according to the present embodiment.

FIG. 6 is a diagram illustrating an example of a PEI according to a second aspect of the present embodiment.

FIG. 10 is a drawing illustrating an example of subgroup set information according to a fourth aspect of the present embodiment.

FIG. 12 is a drawing illustrating an example of specification changes about subgroups total number information in the present embodiment.

FIG. 13 is a diagram illustrating an example of the hardware configuration of each equipment in a wireless communication system according to the present embodiment.

FIG. 14 is a diagram illustrating an example of the functional block configuration of a terminal according to the present embodiment.

FIG. 15 is a diagram illustrating an example of the functional block configuration of a base station according to the present embodiment.

DETAILED DESCRIPTION

Figure 2:
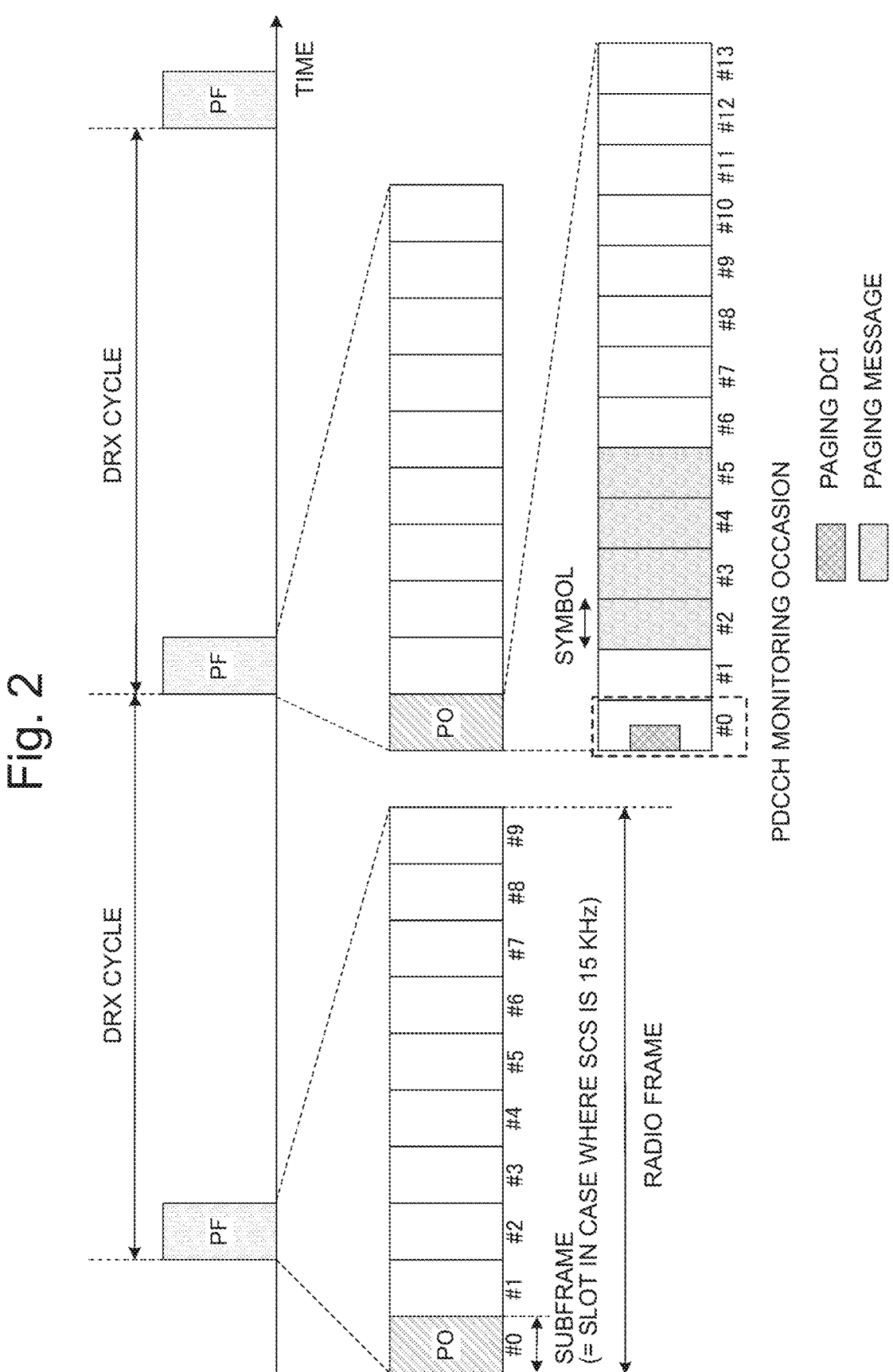
FIG. 2 is a diagram illustrating an example of DRX for paging according to the present embodiment.

An embodiment of this disclosure will be described with reference to the accompanying drawings. Note that, in each figure, members having the same reference sign have the same or similar configuration.

Figure 1:
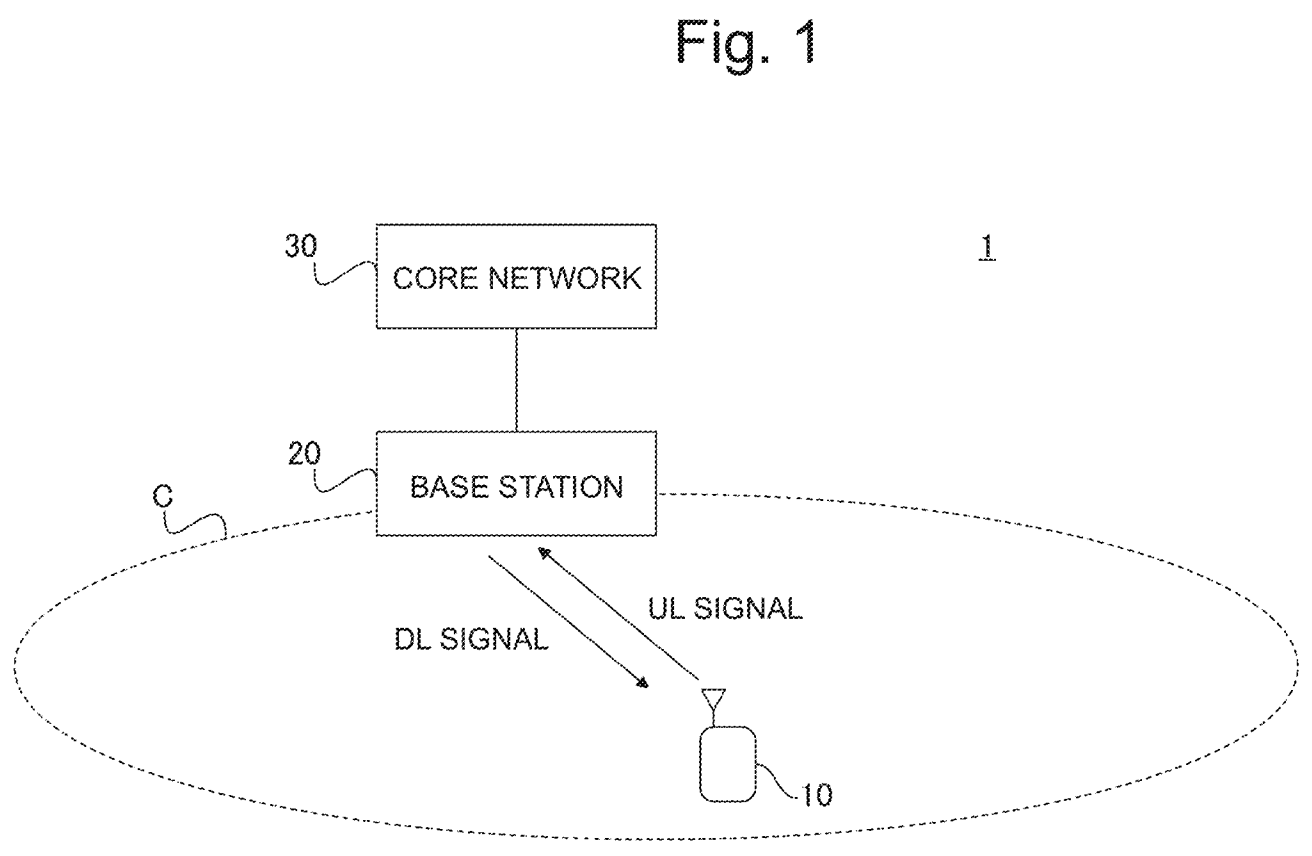

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 or base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs such as the 6th generation (6G) RAT or later can be utilized.

The terminal 10 is a given terminal or equipment such as a smartphone, a personal computer, an in-vehicle terminal, an in-vehicle device, a stationary device, or a telematics control unit (TCU), for example. The terminal 10 may also be called User Equipment (UE), a Mobile Station (MS), a terminal (User Terminal), a radio apparatus, a subscriber terminal, an access terminal, or the like. The terminal 10 may be of a mobile type or a fixed type. The terminal 10 is configured communicably using NR as RAT, for example.

The base station 20 forms one or more cells C to communicate with the terminal 10 using each of the cells. The cell C may also be mutually rephrased as a serving cell, a carrier, a component carrier (CC), and the like. For example, the base station 20 may configure one primary cell and one or more secondary cells for the terminal 10 and communicate with the terminal 10 (also called carrier aggregation). That is, the one or more cells C include at least a primary cell and may include a secondary cell.

One or more bandwidth parts (BWPs) may be configured on one cell C. Here, BWPs mainly used when the terminal 10 initially accesses a cell are also called an initial downlink BWP (Initial DL BWP) and an initial uplink BWP (Initial UL BWP). For example, the base station 20 may broadcast information used to configure respective frequency locations, respective bandwidths, respective subcarrier spacings, and/or respective cyclic prefixes for the initial downlink BWP and the initial uplink BWP in such a form that the information is included in system information (for example, System Information Block (SIB) 1). Further, the base station 20 may broadcast information used to configure respective frequency locations, respective bandwidths, respective subcarrier spacings, and/or respective cyclic prefixes for the initial downlink BWP and the initial uplink BWP in such a form that the information is included in Master Information Block (MIB).

The base station 20 may also be called a gNodeB (gNB), an en-gNB, a Next Generation-Radio Access Network (NG-RAN) node, a low-power node, a Central Unit (CU), a Distributed Unit (DU), a gNB-DU, a Remote Radio Head (RRH), an Integrated Access and Backhaul/Backhauling (IAB) node, or the like. The base station 20 is not limited to one node and may be constituted by a plurality of nodes (for example, a combination of a lower node such as a DU and an upper node such as a CU).

The core network 30 is, for example, an NR-compatible core network (5G Core Network: 5GC), but the core network 30 is not limited thereto. A device on the core network 30 (hereinafter also be referred to as a "core network device") performs mobility management such as paging and location registration of the terminal 10. The core network device may be connected to the base station 20 through a given interface (for example, S1 or NG interface).

The core network device may include, for example, at least one of Access and Mobility Management Function (AMF) for managing C-plane information (e.g., information related to access, mobility management, and the like), and User Plane Function (UPF) for transmission control of U-plane information (e.g., user data).

In the wireless communication system 1, the terminal 10 receives a downlink (DL) signal from the base station 20 and/or transmits an uplink signal (UL). One or more cells C are configured for the terminal 10, and at least one of the cells thus configured is activated. The maximum bandwidth of each cell is, for example, 20 MHz, 400 MHz, or the like.

Further, the terminal 10 performs cell search based on a synchronization signal (for example, Primary Synchronization Signal (PSS) and/or Secondary Synchronization Signal (SSS)) from the base station 20. The cell search is a procedure of the terminal 10 acquiring synchronization of time and frequency in a cell and detecting an identifier of the cell (for example, a physical layer cell ID).

A block including at least one of the synchronization signal, a broadcast channel (for example, Physical Broadcast Channel: PBCH), and a Demodulation Reference Signal (DMRS) for the broadcast channel is also called a Synchronization Signal Block (SSB), an SS/PBCH block, or the like. One or more SSBs may constitute one SS burst, and one or more SS bursts may constitute one SS burst set. An SS burst set may be transmitted at a given cycle (for example, 20 ms (two radio frames)). In a case of multi-beam operation, SSBs of different indices may correspond to different beams and may be transmitted by changing a beam direction sequentially by beam sweeping.

System information broadcast in a cell C may include MIB broadcast through PBCH and/or SIB (for example, SIBx, x=1, 2, . . . ) broadcast through a downlink shared channel (for example, Physical Downlink Shared Channel: PDSCH)). Here, SIB1 is also called remaining system information (RMSI).

The terminal 10 determines a search space and/or a Control Resource Set (CORESET) based on a parameter (hereinafter referred to as an "RRC parameter") included in system information or a Radio Resource Control (RRC) message and performs monitoring of DCI transferred through a downlink control channel (for example, Physical Downlink Control Channel (PDCCH)) in the search space associated with the CORESET. Note that the RRC message may include, for example, an RRC setup message, an RRC reconfiguration message, an RRC resume message, SIB, MIB, and so on.

The monitoring of DCI means that the terminal 10 performs blind decoding on a PDCCH candidate in a search space by a predicted DCI format. The number of bits (also referred to as size, bit width, or the like) of a DCI format is determined or derived in advance in accordance with the number of bits of a field included in the DCI format. The terminal 10 detects DCI for the terminal 10 based on the number of bits of a DCI format, and a specific Radio Network Temporary Identifier (RNTI) used for scrambling (hereinafter referred to as "CRC scrambling") of a Cyclic Redundancy Check (CRC) bit (also called a CRC parity bit) of the DCI format. The monitoring of DCI is also called PDCCH monitoring, monitor, or the like. Further, a period for performing the monitoring of DCI is also called a PDCCH monitoring occasion.

The search space may include a search space (hereinafter referred to as a "common search space (CSS)) used in common by one or more terminals 10, and a terminal-specific search space (a UE-specific search space (USS)). For example, the terminal 10 may monitor CSS (for example, a Type0-PDCCH CSS set or a Type2-PDCCH CSS set) configured by an RRC parameter (for example, RRC IE "pagingSearchSpace") and detect DCI (for example, DCI format 1_0, also called "paging DCI" or the like) subjected to CRC scrambling by specific RNTI (for example, Paging (P)-RNTI). The terminal 10 receives a paging message through PDSCH scheduled by use of the DCI. Here, the base station 20 may configure specific RNTI (for example, P-RNTI) for the terminal 10 by an RRC parameter.

Here, the Type0-PDCCH CSS set may be configured by use of information included in MIB. For example, the base station 20 may configure the Type0-PDCCH CSS set for the terminal 10 by transmitting information for configuring CORESET and/or information for configuring a search space in such a form that the information is included in MIB. Here, the CORESET configured by use of the information included in the MIB is also called CORESET #0. Further, the search space configured by use of the information included in the MIB is also called search space #0. The CORESET #0 and the search space #0 indicate CORESET with index #0 (that is, CORESET with ID #0) and a search space with index #0 (that is, Search Space with ID #0), respectively. That is, a PDCCH monitoring occasion corresponding to the Type0-PDCCH CSS set may be configured by use of the information included in the MIB. Here, the PDCCH monitoring occasion corresponding to the Type0-PDCCH CSS set is also referred to as a PDCCH monitoring occasion corresponding to SIB1.

Further, the Type2-PDCCH CSS set may be configured by use of information included in system information (for example, SIB1). For example, the base station 20 may configure the Type2-PDCCH CSS set for the terminal 10 by transmitting information for configuring the index of CORE-SET and/or information for configuring the index of a search space in such a form that the information is included in the system information. Here, CORESET configured by use of the information included in the system information may be CORESET #0 or CORESET #x (for example, x=1, 2, . . . ). Further, the search space configured by use of the information included in the system information may be search space #0 or search space #x (for example, x=1, 2, . . . ). That is, values other than "0" may be set for the index of CORESET and the index of the search space, configured by use of the information included in the system information. That is, a PDCCH monitoring occasion corresponding to the Type2-PDCCH CSS set may be configured by use of the information included in the system information.

Further, the terminal 10 may monitor USS to detect DCI (for example, a DL assignment or UL grant) subjected to CRC scrambling by specific RNTI (for example, Cell (C)-RNTI) and control data reception using PDSCH scheduled by the DCI or data transmission using an uplink shared channel (for example, Physical Uplink Shared Channel (PUSCH)). Note that a set of one or more search spaces may be called a search space set, a set including one or more CSS may be called a CSS set, and a set including one or more USS may be called a USS set.

Paging

Paging is used for setup of a network-initiated connection in a case where the terminal 10 is in an idle state or in an inactive state. Further, the paging is used for transmission of a short message regardless of a state of the terminal 10 (for example, the idle state, the inactive state, or a connected state), for an indication of modification of system information and/or public warning. The public warning is, for example, Earthquake and Tsunami Warning System (ETWS), Commercial Mobile Alert System (CMAS), or the like.

Here, the idle state is a state where a connection in an RRC layer (hereinafter referred to as "RRC connection") between the terminal 10 and the base station 20 is not established and is also called RRC_IDLE, an idle mode, an RRC idle mode, or the like. The terminal 10 in the idle state receives system information broadcast in a camp-on cell. When the RRC connection is established, the terminal 10 in the idle state transitions to the connected state.

Further, the inactive state is a state where the RRC connection is established but is suspended and is also called an RRC_INACTIVE state, an inactive mode, an RRC inactive mode, and the like. The terminal 10 in the inactive state receives the system information broadcast in the camp-on cell. When the RRC connection is resumed, the terminal 10 in the inactive state transitions to the connected state, and when the RRC connection is released, the terminal 10 transitions to the idle state.

The connected state is a state where the RRC connection is established and is also called an RRC CONNECTED state, a connected mode, an RRC connected mode, and the like. When the RRC connection is released, the terminal 10 in the connected state transitions to the idle state, and when the RRC connection is suspended, the terminal 10 transitions to the inactive state.

The terminal 10 performs PDCCH monitoring in a paging period and performs DRX in which the terminal 10 sleeps in a period other than the paging period. The paging period may be, for example, a paging frame (PF) and/or a paging occasion (PO). The PO includes one or more time units. The time unit may be one or more slots, one or more subframes, or one or more symbols, for example. The PO may include one or more PDCCH monitoring occasions.

FIG. 2 is a diagram illustrating an example of DRX for paging according to the present embodiment. As illustrated in FIG. 2, a PF is provided at a given cycle called a DRX cycle. The PF may be constituted by one radio frame, for example, and may be identified by System Frame Number (SFN). One radio frame is constituted by 10 subframes #0 to #9, and in a case where the subcarrier spacing is 15 kHz, one radio frame is constituted by 10 slots #0 to #9, for example. Note that it is needless to say that the number of slots per PF varies in accordance with the subcarrier spacing.

For example, in FIG. 2, a PO number $N_s$ per PF is 1. The terminal 10 synchronizes time and frequency before a PF (or a PO or a PDCCH monitoring occasion in the PO). The synchronization of time and frequency uses an SSB, for example, but the synchronization is not limited to this. In FIG. 2, the terminal 10 detects paging DCI in a PDCCH monitoring occasion in the PO and receives a paging message through PDSCH scheduled by the paging DCI.

In a case of CN-initiated paging, a paging message is transferred in a plurality of cells C in a tracking area, and in a case of RAN-initiated paging, a paging message is transferred over one or more cells C in an RAN area. The RAN area is identified by an RAN Area Identifier (RAI), and the tracking area is identified by a Tracking Area Identifier (TAI). The RAN area includes one or more cells C, and the tracking area includes one or more RAN areas.

The terminal 10 controls establishment of a connection with a network side (for example, the CN 30 and/or the base station 20), based on a list (for example, RRC IE "pagingRecordList") of one or more terminal identifiers in the paging message, and a terminal identifier assigned to the terminal 10. For example, the terminal 10 may start the procedure of establishing the connection with the network side in a case where the terminal identifier assigned to the terminal 10 is included in the list. Here, the terminal identifier is the identifier of the terminal 10 and may be a 5G S-Temporary Mobile Subscription Identifier (5G-S-TMSI) as a temporary terminal identifier to uniquely identify the terminal 10 in the tracking area, for example.

Note that, in FIG. 2, the PO number $N_s$ per PF is one but is not limited to this, and the PO number $N_s$ may be plural. Further, in FIG. 2, a PO is one subframe (slot), but as described above, the time unit constituting the PO is not limited to this. Further, in FIG. 2, a PO associated with a given PF is provided within the given PF, but the PO is not limited to this and may start from a given location before or after the given PF. Further, a PDCCH monitoring occasion for a given PO may be provided over a plurality of radio frames.

The SFN of the PF for the terminal 10 may be determined based on the 5G-S-TMSI as the terminal identifier and a DRX cycle T. For example, the SFN for the PF may be determined based on PF_Offset as a given offset, the DRX cycle T, a PF number N in the DRX cycle T, and a PO number $N_s$ per PF in accordance with Equation 1.

$$\text{(SFN+PF\_Offset)mod } T = (T \text{ div } N)*(\text{UE\_ID mod } N) \qquad \text{Equation 1}$$

Here, UE_ID=5G-S-TMSI mod 1024

According to Equation (1), a plurality of terminals 10 is assigned to the same paging period (for example, a PF and/or a PO). In the meantime, even when the terminal 10 receives paging DCI, the terminal 10 cannot determine to which terminal 10 the paging is addressed, until the terminal 10 decodes the list of terminal identifiers in the paging message. Accordingly, among the plurality of terminals 10 sharing the same paging period, a terminal 10 untargeted for paging in the paging period might unnecessarily perform time and frequency synchronization and PDCCH monitoring in the PO. As a result, power consumption of the terminal 10 untargeted for paging in the paging period might be wasted.

Subgrouping

In order to reduce the waste of power consumption of the terminal 10 untargeted for paging, it is also considered to divide the plurality of terminals 10 assigned to the same paging period into given units (hereinafter referred to as "subgroups") and perform paging for each subgroup. More specifically, terminal-identifier-based subgrouping and network-based subgrouping are considered.

In the terminal-identifier-based subgrouping, the terminal 10 determines a subgroup assigned to the terminal 10 itself based on the terminal identifier. More specifically, the terminal 10 may determine an identifier (hereinafter referred to as a "subgroup ID") of the subgroup based on at least one of the PF number N in the DRX cycle T, the PO number $N_s$ per PF, and a total number of subgroups $N_{sg}$ in addition to the terminal identifier 5G-S-TMSI. For example, the terminal 10 may determine the subgroup ID in accordance with Equation 2.

$$\text{Subgroup ID=floor(UE ID/}(N*N_s)\text{)mod } N_{sg} \qquad \text{Equation 2}$$

Here, UE_ID=5G-S-TMSI mod 1024

In the meantime, in the network-based subgrouping, subgrouping is performed on a network side (for example, the base station 20 or the CN 30). The device on the network side may determine a subgroup to be assigned to the terminal 10 based on information managed on the network side (for example, a mobility state of the terminal 10, a paging probability, and/or a power consumption profile of the terminal 10, and the like). The device on the network side informs the terminal 10 of information (for example, the subgroup ID) indicative of the determined subgroup.

PEI

In a case where the subgrouping is performed, to indicate in advance, to the terminal 10, a subgroup targeted for paging in a paging period (hereinafter referred to as "paging early indication (PEI)") can contribute to reduction of wasteful power consumption. More specifically, based on the PEI, the terminal 10 skips PDCCH monitoring, and/or reception and/or decoding of a paging message in a paging period during which the subgroup that the terminal 10 belongs to is untargeted for paging, so that the terminal 10 can reduce electric power to be consumed.

The PEI is considered to be on the basis of DCI, SSS, a Tracking Reference Signal (TRS), or the like. Hereinafter, the present embodiment describes DCI-based PEI but is also applicable to SSS-based PEI or TRS-based PEI appropriately. Note that the TRS may be called a non-zero power channel state information reference signal (NZP-CSI-RS).

Figure 3:
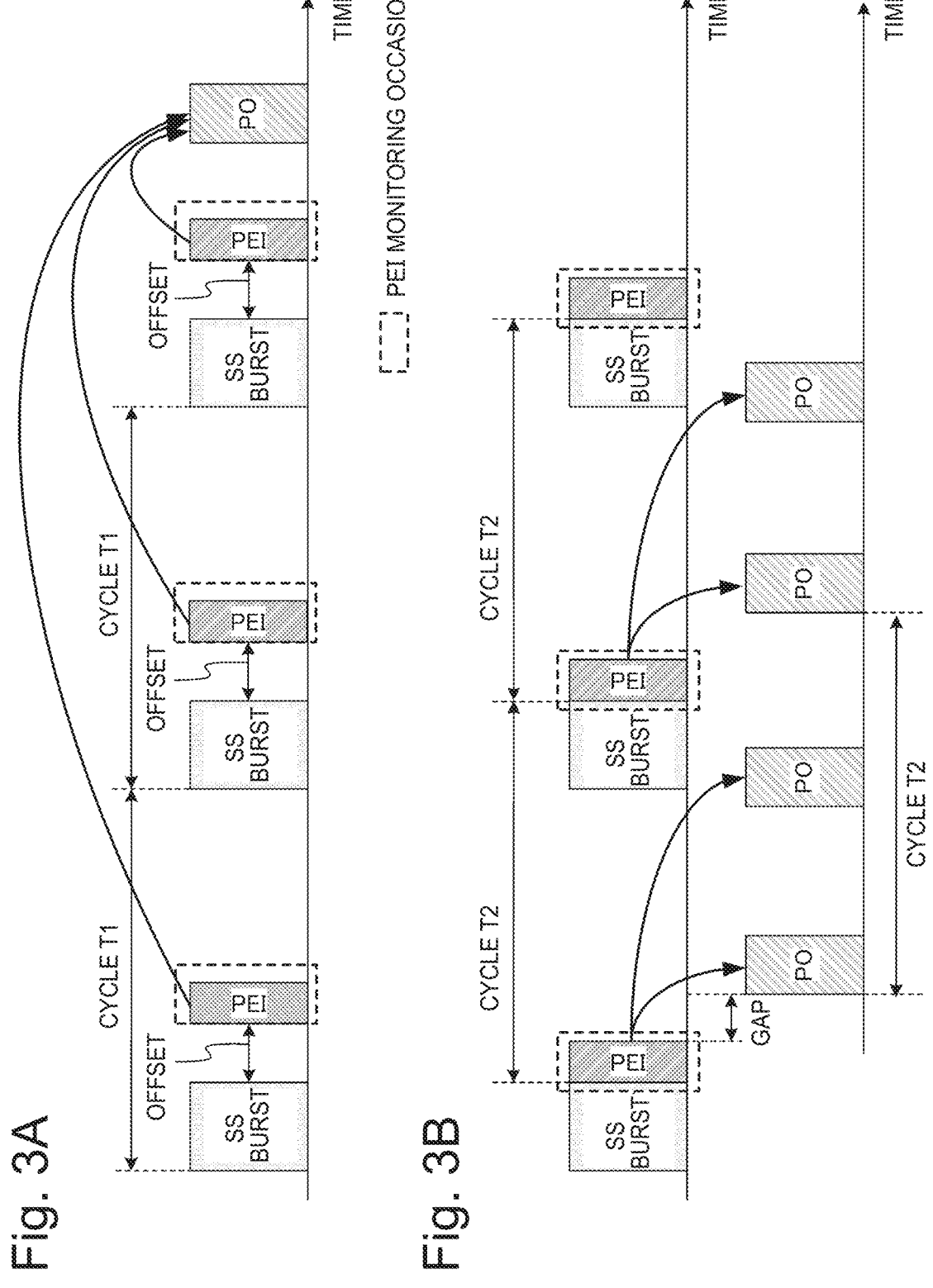
FIGS. 3A and 3B are diagrams illustrating an example of a PEI according to the present embodiment.

FIGS. 3A and 3B are diagrams each illustrating an example of PEI according to the present embodiment. For example, as illustrated in FIGS. 3A and 3B, a PDCCH monitoring occasion for PEI (hereinafter referred to as a "PEI monitoring occasion") may be determined based on an SS burst, an SS burst set, and/or a time location of a PO. The terminal 10 may detect SSB in one or more SS bursts and perform time and frequency synchronization for the PO. For example, a period of an SS burst set may be 0.5 ms (for example, 0.5 radio frames (also referred to as a half frame)). That is, the SSB and the SS burst may be included within a period of 0.5 ms. For example, the base station 20 may transmit, to the terminal 10, information (for example, RRC IE "ssb-periodicityServingCell") for configuring a cycle (that is, a cycle of the SS burst set) of a half frame to reception of SSB.

Further, an index of a first symbol for SSB candidates may be determined for the half frame including SSB based on Subcarrier Spacing (SCS) of SSB. For example, a location (for example, a location of an OFDM symbol) of an SSB candidate in a time domain may be defined for each of cases where the subcarrier spacing of SSB is 15 kHz, 30 kHz, 120 kHz, and 240 kHz. Here, the base station 20 may transmit, to the terminal 10, information (for example, RRC IE "ssbSubcarrierSpacing") used to configure the subcarrier spacing of SSB. Further, the base station 20 may transmit, to the terminal 10, information (for example, RRC IE "ssb-PositionsInBurst") used to configure a location in the time domain where SSB is actually transmitted among the SSB candidates.

For example, in FIG. 3A, each PEI monitoring occasion may be configured based on a time offset to each SS burst or each SS burst set. Note that, in FIG. 3A, a time offset is given from the end of each SS burst, but a time offset may be given from the beginning of each SS burst or each SS burst set. The terminal 10 may not configure a PEI monitoring occasion for each SS burst or for each SS burst set, and a PEI monitoring occasion should be set in at least one SS burst or one SS burst set detected by the terminal 10. For example, in FIG. 3A, one or more PEIs (here three PEIs) correspond to one PO but are not limited to this. That is, for example, the base station 20 may configure a time offset by an RRC parameter, and the terminal 10 may monitor PDCCH for a DCI format including PEI in a monitoring occasion determined based on the time offset thus configured.

For example, a period of the time offset from an SS burst or an SS burst set may be determined based on the subcarrier spacing of SSB. For example, in a case where 15 kHz is configured as the subcarrier spacing of SSB and 1 ms is configured as the time offset, the terminal 10 may start monitoring of PDCCH for a DCI format including PEI at a symbol after 10 slots from an SS burst or an SS burst set. Further, in a case where 30 kHz is configured as the subcarrier spacing of SSB and 1 ms is configured as the time offset, the terminal 10 may start monitoring of PDCCH for a DCI format including PEI at a symbol after 20 slots from an SS burst or an SS burst set.

Further, for example, a period of the time offset from an SS burst or an SS burst set may be determined based on the subcarrier spacing of initial downlink BWP. For example, in a case where 15 kHz is configured as the subcarrier spacing of initial downlink BWP and 1 ms is configured as the time offset, the terminal 10 may start monitoring of PDCCH for a DCI format including PEI at a symbol after 10 slots from an SS burst or an SS burst set. Further, in a case where 30 kHz is configured as the subcarrier spacing of initial downlink BWP and 1 ms is configured as the time offset, the terminal 10 may start monitoring of PDCCH for a DCI format including PEI at a symbol after 20 slots from an SS burst or an SS burst set.

In the meantime, in FIG. 3B, each PEI monitoring occasion is provided at a given cycle T2 at a time location with a given gap from a specific PO. As illustrated in FIG. 3B, one PEI may correspond to one or more POs (here two POs). Note that FIGS. 3A and 3B are just examples, and the PEI monitoring occasion is not limited to those illustrated herein. For example, a monitoring window including a plurality of PEI monitoring occasions may be provided. That is, the base station 20 may configure a monitoring window (a monitoring period) in which the terminal 10 performs monitoring of PDCCH for a DCI format including PEI.

The PEI thus monitored in the PEI monitoring occasion should be included in a given DCI format. For example, the PEI may be included in an existing DCI format (for example, DCI format 1_0) or may be included in a newly defined DCI format. Further, the DCI format including PEI may be subjected to CRC scrambling by specific RNTI (for example, P-RNTI). Note that the PEI is not limited to being included in a DCI format, and the DCI format itself may be called PEI.

Further, a search space configured for monitoring of PDCCH (that is, a PDCCH candidate) for a DCI format including PEI may be a search space (for example, a Type0-PDCCH CSS set or a Type2-PDCCH CSS set) used for monitoring of paging DCI or may be a search space newly configured for PDCCH monitoring for the DCI format including PEI. As described above, the Type0-PDCCH CSS set may be configured by use of information included in MIB. Further, the Type2-PDCCH CSS set and the search space configured newly may be configured by use of information included in system information (for example, SIB1). That is, the search space configured newly may be a CSS set.

For example, in a case where the base station 20 configures a search space used for monitoring of PDCCH for the DCI format including PEI by use of information included in system information (for example, SIB1), the base station 20 may transmit information for configuring an index of CORESET and/or information for configuring an index of the search space in such a form that the information is included in the system information (for example, SIB1).

Here, in a case where CORESET #0 and/or search space #0 is configured by the base station 20, the terminal 10 may monitor PDCCH for the DCI format including PEI in the Type0-PDCCH CSS set. That is, in a case where index #0 is configured for CORESET by use of information for configuring the index of CORESET, included in system information, the terminal 10 may monitor PDCCH for the DCI format including PEI in a PDCCH monitoring occasion corresponding to the Type0-PDCCH CSS set. Further, in a case where index #0 is configured for a search space by use of information for configuring the index of the search space, included in system information, the terminal 10 may monitor PDCCH for the DCI format including PEI in a PDCCH monitoring occasion corresponding to the Type0-PDCCH CSS set. That is, in a case where CORESET #0 and/or search space #0 is configured by use of system information, the terminal 10 may monitor PDCCH for the DCI format including PEI in a PDCCH monitoring occasion (that is, a PDCCH monitoring occasion corresponding to CORESET #0 and/or search space #0) configured by use of information included in MIB.

Here, in a case where an index other than #0 is configured for CORESET by use of information for configuring the index of CORESET, included in system information, the terminal 10 may monitor PDCCH for the DCI format including PEI in the CORESET with the index thus configured. Further, in a case where an index other than #0 is configured for a search space by use of information for configuring the index of the search space, included in system information, the terminal 10 may monitor PDCCH for the DCI format including PEI in the search space with the index thus configured. That is, in a case where CORESET #x (for example, x=1, 2, . . . ) and/or search space #x (for example, x=1, 2, . . . ) is configured by use of system information, the terminal 10 may monitor PDCCH for the DCI format including PEI in a PDCCH monitoring occasion corresponding to the CORESET #x (for example, x=1, 2, . . . ) and/or the search space #x (for example, x=1, 2, . . . ).

Here, in terms of PEI, a first operation and/or a second operation may be defined. For example, in the first operation, in a case where a subgroup corresponding to the terminal 10 is targeted for paging, PEI may indicate that the terminal 10 performs monitoring in a paging period (that is, a PF and/or a PO). That is, in the first operation, PEI may indicate that the subgroup corresponding to the terminal 10 is paged. For example, in a case where the subgroup corresponding to the terminal 10 (the subgroup to which the terminal 10 belongs) is paged, PEI is transmitted, but in a case where the subgroup is not paged, PEI may not be transmitted. Further, in the first operation, in a case where the subgroup corresponding to the terminal 10 is paged, PEI may indicate that the terminal 10 performs monitoring in the paging period. That is, in the first operation, in a case where PEI is not detected in a PEI monitoring occasion corresponding to a given paging period (for example, all PEI monitoring occasions corresponding to a given paging period), the terminal 10 may not perform monitoring in the given paging period (monitoring in the given paging period may not be requested).

Further, in the second operation, PEI may indicate whether the terminal 10 performs monitoring in a paging period (that is, a PF and/or a PO) or not. That is, in the second operation, PEI may indicate whether the subgroup corresponding to the terminal 10 is paged or not. In this case, regardless of whether the subgroup corresponding to the terminal 10 (the subgroup to which the terminal 10 belongs) is paged or not, PEI is transmitted. The PEI may be, for example, a bit map (for example, FIG. 4 or 6) described below or may be a code point (for example, FIG. 5 or 7) described below. That is, in the second operation, in a case where PEI is not detected in a PEI monitoring occasion corresponding to a given paging period (for example, all PEI monitoring occasions corresponding to a given paging period), the terminal 10 may perform monitoring in the given paging period (monitoring in the given paging period may be requested).

Here, in the first operation and the second operation, to perform monitoring in a given paging period may include the meaning of monitoring of PDCCH for a DCI format (for example, DCI format 1_0 to which a CRC parity bit scrambled by P-RNTI is added) subjected to CRC scrambling by specific RNTI (for example, P-RNTI) in the given paging period. Further, to perform monitoring in a given paging period may include the meaning of decoding (for example, receiving of a paging message) of PDSCH scheduled by use of a DCI format subjected to CRC scrambling by the specific RNTI in the given paging period.

Further, in the first operation and the second operation, to perform no monitoring (or to skip monitoring) in a given paging period may include the meaning of inexecution of monitoring of PDCCH for a DCI format subjected to CRC scrambling by the specific RNTI in the given paging period. Further, in the first operation and the second operation, to perform no monitoring in a given paging period may include the meaning of inexecution of decoding (for example, receiving of a paging message) of PDSCH scheduled by use of a DCI format subjected to CRC scrambling by the specific RNTI in the given paging period. That is, in the first operation and the second operation, to perform no monitoring (or to skip monitoring) in a given paging period may include the meaning of monitoring of PDCCH for a DCI format subjected to CRC scrambling by the specific RNTI without decoding PDSCH scheduled by use of the DCI format in the given paging period (for example, performing only decoding of a short message included in the DCI format without decoding PDSCH may be included). Note that, in the first operation and the second operation, to perform no monitoring (or to skip monitoring) in a given paging period may include the meaning of inexecution of monitoring of PDCCH and decoding of PDSCH in the given paging period.

In the present embodiment, the name PEI is just an example, and any name is usable, provided that information corresponding to PEI has a function similar to the function described in the present embodiment.

In the meantime, as described above, in monitoring of PDCCH, the terminal 10 detects DCI for the terminal 10 based on the number of bits of a DCI format to be monitored and RNTI used for CRC scrambling of the DCI format. Accordingly, in order that the terminal 10 detects PEI in a PEI monitoring occasion, it is necessary to grasp the number of bits of PEI in advance. In a case where the terminal 10 cannot grasp the number of bits of PEI in advance, it may be difficult to control monitoring of the PEI appropriately.

In a case where the subgrouping is performed, it is also considered to determine the total number of subgroups $N_{sg}$ for each given unit (a cell C, an RNA area, or a tracking area). In this case, the number of bits of PEI can change in accordance with the total number of subgroups $N_{sg}$. In view of this, in the present embodiment, the terminal 10 controls monitoring in a PEI monitoring occasion appropriately by determining the number of bits of PEI based on the total number of subgroups $N_{sg}$.

Hereinafter, the present embodiment will describe a monitoring control (a first aspect) of PEI indicative of a subgroup targeted for paging in one paging period, and a monitoring control (a second aspect) of PEI indicative of respective subgroups targeted for paging in a plurality of paging periods. Note that monitoring of PEI may be also expressed as monitoring of DCI (or a DCI format) including PEI.

Note that, in the following description, each paging period used in the first and second aspects is a PO, for example, but the paging period is not limited to this.

Further, in the first aspect, one PEI monitoring occasion is provided for each PO. However, the first aspect is not limited to this, and a plurality of PEI monitoring occasions may be provided for each PO.

Further, a plurality of POs used in the second aspect is associated with one PF. However, the second aspect is not limited to this. In the second aspect, one PEI monitoring occasion is provided for each PF. However, the second aspect is not limited to this, and a plurality of PEI monitoring occasions may be provided for each PF. Further, PEI corresponding to a plurality of POs associated with a plurality of PFs, respectively, may be used.

First Aspect

In the first aspect, the terminal 10 receives DCI including a field (hereinafter referred to as a "subgroup indication field") indicating a subgroup targeted for paging in a PO. Note that PEI may correspond to the subgroup indication field or may correspond to DCI including the subgroup indication field. Here, the terminal 10 receives DCI including a subgroup indication field as PEI for each PO and controls execution of monitoring in the PO based on a value of the subgroup indication field. The following mainly describes a control on monitoring of paging DCI in a PO based on a value of a subgroup indication field (that is, a value of PEI), but the operation related to PEI may be the aforementioned first operation and/or second operation.

Further, the terminal 10 receives information (hereinafter referred to as "subgroups total number information") on the total number of subgroups $N_{sg}$. The total number of subgroups $N_{sg}$ may be the total number of subgroups to which a plurality of terminals 10 belongs, respectively, the plurality of terminals 10 being determined to correspond to a PF of the same SFN based on the aforementioned terminal identifier (for example, 5G-S-TMSI), for example. The subgroups total number information may indicate, for example, any of 2 to 16 as the total number of subgroups $N_{sg}$.

More specifically, the terminal 10 may receive subgroups total number information by signaling (hereinafter referred to as "higher layer signaling") of a higher layer (for example, a Non Access Stratum (NAS) layer, a Radio Resource Control (RRC) layer, or the like). The subgroups total number information may be included in system information (for example, System Information Block (SIB) 1) broadcast from the base station 20 and may be called "nrofPagingSubGroup" or the like.

The terminal 10 determines the number of bits of a subgroup indication field as PEI (that is, a field of PEI) based on the subgroups total number information. That is, the terminal 10 may determine the number of bits of a DCI format including PEI based on the number of bits. The terminal 10 performs blind decoding on a PDCCH candidate in a search space in a PEI monitoring occasion, based on the number of bits of the DCI format, to detect the PEI. That is, based on the subgroups total number information broadcast from the base station 20, the terminal 10 may determine the number of bits of the subgroup indication field (that is, the field of PEI) in the DCI format.

For example, the subgroup indication field as PEI may be constituted by a bit map with the number of bits equal to the total number of subgroups $N_{sg}$ indicated by the subgroups total number information or may be constituted by a code point with the number of bits determined based on the total number of subgroups $N_{sg}$. That is, the code point may correspond to PEI (the field of PEI).

Bit Map

Figure 4:
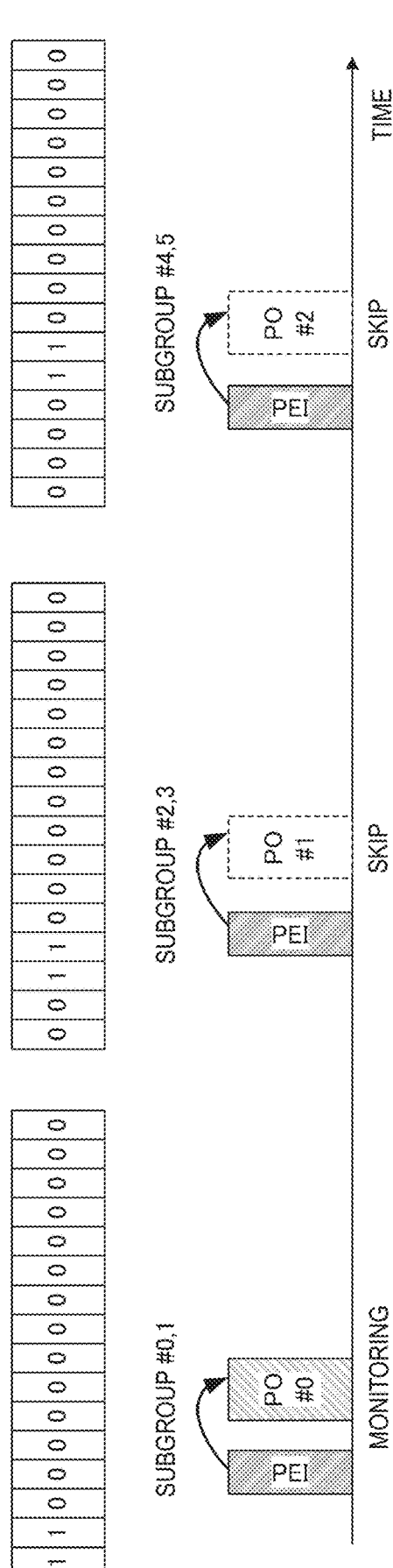
FIG. 4 is a diagram illustrating an example of a PEI according to a first aspect of the present embodiment.

FIG. 4 is a drawing illustrating an example of PEI according to the first aspect of the present embodiment. In FIG. 4, for example, the total number of subgroups $N_{sg}$ is 16, and the terminal 10 belongs to subgroup #1 out of subgroups #0 to #15. Note that subgroup #1 to which the terminal 10 belongs may be derived by the terminal 10 itself based on the terminal identifier (for example, 5G-S-TMSI) assigned to the terminal 10 or may be notified to the terminal 10 from the network side.

In FIG. 4, a subgroup indication field as each PEI is constituted by a bit map with the number of bits equal to the total number of subgroups $N_{sg}$=16. Sixteen bits in the bit map correspond to subgroups #0 to #15, respectively. For example, in FIG. 4, a most significant bit (MSB) (also referred to as a left end bit) corresponds to subgroup #0, the second bit from the left corresponds to subgroup #1, and the third to sixteenth bits correspond to subgroups #2 to #15.

For example, in FIG. 4, subgroup indication fields in respective PEIs corresponding to POs #0 to #2 indicate that paging targets in PO #0 are subgroups #0 and #1, paging targets in PO #1 are subgroups #2 and #3, and paging targets in PO #2 are subgroups #4 and #5. As described above, the terminal 10 belongs to subgroup #1, and therefore, the terminal 10 monitors paging DCI in PO #0 in which subgroup #1 is included in the paging targets, but the terminal 10 may skip monitoring of paging DCI in PO #1 and PO #2 in which subgroup #1 is not included in the paging targets. Further, for example, the terminal 10 belonging to subgroup #1 decodes PDSCH in PO #0 but may not decode PDSCH in PO #1 and PO #2.

As illustrated in FIG. 4, in a case where the subgroup indication field as PEI is constituted by a bit map with the number of bits equal to the total number of subgroups $N_{sg}$, even when one or more subgroups in one PO are targeted for paging, a subgroup targeted for paging can be specified easily.

Code Point

Figure 5:
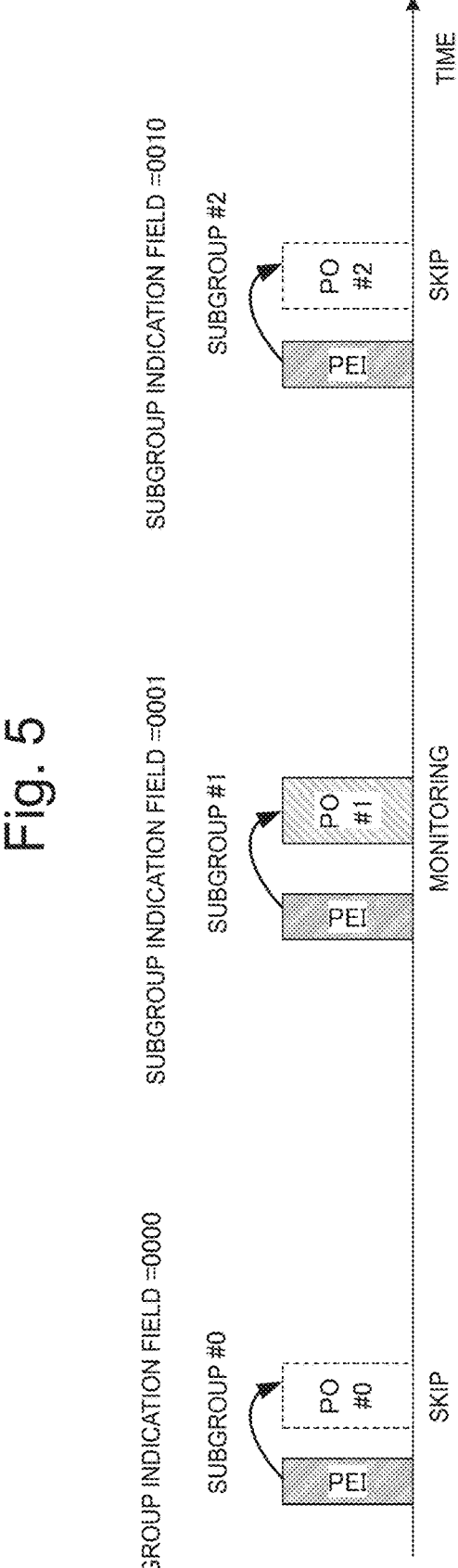
FIG. 5 is a diagram illustrating another example of the PEI according to the first aspect of the present embodiment.

FIG. 5 is a drawing illustrating another example of PEI according to the first aspect of the present embodiment. In terms of FIG. 5, the following mainly describes differences from FIG. 4. In FIG. 5, a subgroup indication field as each PEI is constituted by a code point with the number of bits determined based on the total number of subgroups $N_{sg}$=16. One or more subgroups associated with each code point (that is, each value set in the field of PEI) may be determined in the specifications in advance or may be informed to the terminal 10 by higher layer signaling. For example, in FIG. 5, code point "0000" indicates subgroup #0, "0001" indicates subgroup #1, and "0010" to "1111" indicate subgroups #2 to #15. For example, the base station 20 may broadcast the correspondence between each code point (that is, each value set in the field of PEI) and one or more subgroups in such a form that the correspondence is included in system information (for example, SIB1). That is, the terminal 10 may identify one or more subgroups based on the correspondence and the values set in the field of PEI.

Note that, in FIG. 5, each code point indicates one subgroup, but each code point may indicate one or more subgroups determined in advance or informed by higher layer signaling. In a case where the subgroup indication field is constituted as a code point indicating one or more subgroups as such, the number of bits of the subgroup indication field may be indicated by ceil (log 2 ($N_{sg}$)), for example. In FIG. 5, $N_{sg}$ is equal to 16, and therefore, the subgroup indication field has four bits.

For example, in FIG. 5, respective subgroup indication fields in three PEIs of POs #0 to #2 indicate that a paging target in PO #0 is subgroup #0, a paging target in PO #1 is subgroup #1, and a paging target in PO #2 is subgroup #2. As described above, since the terminal 10 belongs to subgroup #1, the terminal 10 monitors paging DCI in PO #1 in which subgroup #1 is included in the paging targets, but the terminal 10 may skip monitoring of paging DCI in POs #0 and #2 in which subgroup #1 is not included in the paging targets. Further, for example, the terminal 10 belonging to subgroup #1 decodes PDSCH in PO #1 but may not decode PDSCH in POs #0 and #2.

As illustrated in FIG. 5, in a case where the subgroup indication field as PEI is constituted by a code point indicating one or more subgroups, the number of bits of the subgroup indication field can be reduced, and overhead by PEI can be reduced in comparison with a case of the bit map illustrated in FIG. 4.

Note that, in FIGS. 4 and 5, a PEI monitoring occasion is provided before each PO, but a PEI monitoring occasion may be provided in a PO. For example, a PEI monitoring occasion may be provided in a slot or a symbol before a PDCCH monitoring occasion in a PO, and monitoring of paging DCI in the PDCCH monitoring occasion in the PO may be controlled based on PEI detected in the PO as described above. As such, FIGS. 4 and 5 are just examples, and the present invention is not limited to those illustrated herein.

In the first aspect, since the number of bits of the subgroup indication field is determined appropriately based on the total number of subgroups $N_{sg}$, monitoring in a PEI monitoring occasion can be performed appropriately. Further, since a subgroup targeted for paging in each PO can be specified by use of DCI-based PEI for each PO, the subgroup targeted for paging can be controlled dynamically for each PO.

Here, the base station 20 may configure whether the terminal 10 operates in the first operation or the second operation. For example, the base station 20 may broadcast information (hereinafter also referred to as a "monitoring operation indication") for configuring whether the terminal 10 operates in the first operation or the second operation, in such a form that the information is included in system information (for example, SIB1). For example, the monitoring operation indication may be configured in common to one or more terminals 10. Further, for example, the monitoring operation indication may be configured to a group of terminals 10 monitoring a DCI format (the same DCI format) including PEI.

That is, in a case where PEI is not detected in a PEI monitoring occasion corresponding to a given paging period (for example, all PEI monitoring occasions corresponding to a given paging period), the terminal 10 configured to perform the first operation may not perform monitoring in the given paging period. Further, in a case where PEI is not detected in a PEI monitoring occasion corresponding to a given paging period (for example, all PEI monitoring occasions corresponding to a given paging period), the terminal 10 configured to perform the second operation may perform monitoring in the given paging period.

Further, the base station 20 may transmit the monitoring operation indication in such a form that the monitoring operation indication is included in a DCI format (for example, DCI format 1_0 subjected to CRC scrambling by P-RNTI). Here, the base station 20 may transmit the monitoring operation indication in such a form that the monitoring operation indication is included in a short message. For example, an information field of one bit may be defined as a field to indicate a monitoring operation and transmitted with the field of PEI (for example, the subgroup indication field).

Further, the monitoring operation indication may be defined to be included in the field of PEI (for example, the subgroup indication field). For example, the base station 20 may indicate one or more subgroups and/or a monitoring operation by use of a value set in the field of PEI (for example, a value set in the subgroup indication field). Further, the base station 20 may broadcast the correspondence between each code point (that is, each value set in the field of PEI) and one or more subgroups and/or a monitoring operation in such a form that the correspondence is included in system information (for example, SIB1). That is, the terminal 10 may identify one or more subgroups and/or a monitoring operation based on the correspondence and the values set in the field of PEI.

For example, based on the monitoring operation indication associated with a given paging period (that is, a PF and/or a PO) in a given DRX cycle (for example, an n-th DRX cycle), the terminal 10 may determine an operation (the first operation or the second operation) in a corresponding paging period (that is, a PF and/or a PO in an (n+1)th DRX cycle that is the same as the PF and/or the PO in the n-th DRX cycle) in a subsequent DRX cycle (for example, the (n+1)th DRX cycle).

Here, as a default operation in the terminal 10, the first operation or the second operation may be defined. For example, in a case where only the total number of subgroups $N_{sg}$ is broadcast from the base station 20 (that is, in a case where only the total number of subgroups $N_{sg}$ is configured and the monitoring operation is not indicated), the terminal 10 may perform the first operation or the second operation. For example, when the terminal 10 performs the first operation as the default operation, the terminal 10 can be defined not to perform monitoring in a given paging period in a case where PEI is not detected, so that electric power to be consumed in the terminal 10 can be reduced. Further, when the terminal 10 performs the second operation as the default operation, the terminal 10 can be defined to perform monitoring in a given paging period in a case where PEI is not detected, so that the terminal 10 can surely detect and/or receive paging DCI and/or PDSCH.

Second Aspect

The terminal 10 receives DCI including PEI corresponding to a plurality of POs, that is, DCI including a field (hereinafter referred to as a "PO/subgroup indication field") indicating respective subgroups targeted for paging in the plurality of POs. The terminal 10 receives the DCI and controls execution of monitoring in the plurality of POs based on a value of the PO/subgroup indication field as PEI. In the following description, the plurality of POs is a plurality of POs associated with the same PF but is not limited to this. The following mainly describes a control on monitoring of paging DCI in a PO based on a value (that is, a value of PEI) of the PO/subgroup indication field, but the operation related to PEI may be the aforementioned first operation and/or second operation. The second aspect mainly describes differences from the first aspect.

The terminal 10 may receive information (hereinafter referred to as "PO number information") about the number $N_s$ of the plurality of POs (for example, the number of POs associated with the same PF) in addition to the subgroups total number information. The terminal 10 may receive the subgroups total number information and the PO number information by higher layer signaling. The subgroups total number information and/or the PO number information may be included in system information (for example, SIB1) broadcast from the base station 20.

The terminal 10 determines the number of bits of the PO/subgroup indication field as PEI based on the subgroups total number information and the PO number information. The terminal 10 controls monitoring of PEI based on the number of bits.

The PO/subgroup indication field may be constituted by a bit map with the number of bits equal to a multiplication value obtained by multiplying the total number of subgroups $N_{sg}$ indicated by the subgroups total number information by the PO number $N_s$ indicated by the PO number information.

Alternatively, the PO/subgroup indication field may include a subgroup indication field (also called a first field) of the number of bits determined based on the total number of subgroups $N_{sg}$, and a field (hereinafter referred to as a "PO indication field," also called a second field) of the number of bits determined based on the PO number.

Alternatively, the PO/subgroup indication field may be a single field indicating which subgroup is targeted for paging in which PO out of the plurality of POs. The number of bits of the PO/subgroup indication field is determined based on the total number of subgroups $N_{sg}$ and the PO number $N_s$ and may be equal to the total number of bits of the subgroup indication field and the PO indication field, for example.

Bit Map

Figure 6:
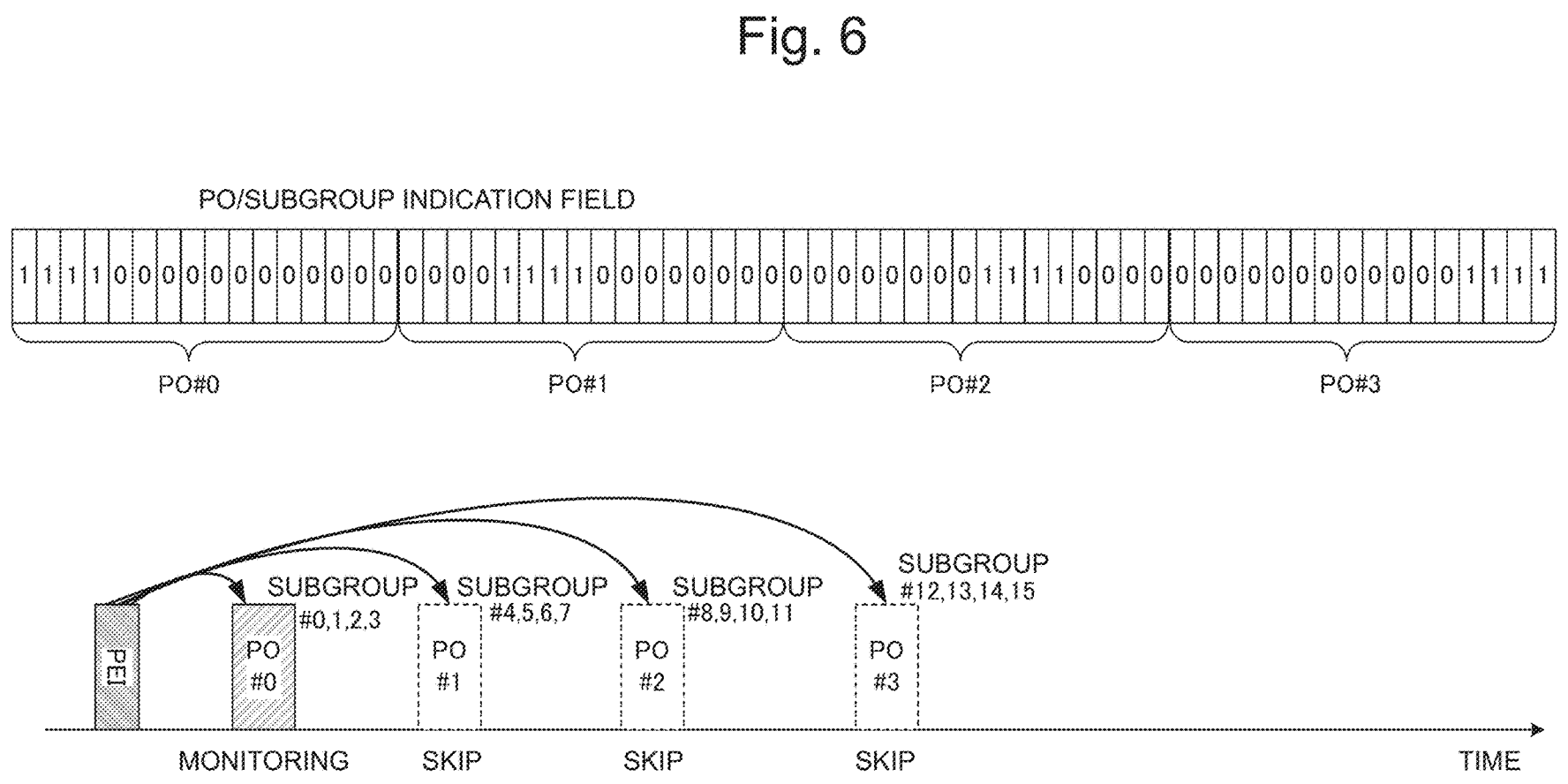

FIG. 6 is a diagram illustrating an example of PEI according to the second aspect of the present embodiment. In FIG. 6, four POs #0 to #3 are associated with one PF, and the PO number $N_s$ is 4, for example. Further, the total number of subgroups $N_{sg}$ is 16, and the terminal 10 belongs to subgroup #1 among subgroups #0 to #15. Note that, in terms of FIG. 6, the following mainly describes differences from FIG. 4.

In FIG. 6, the PO/subgroup indication field as PEI is constituted by a bit map with the number of bits equal to 64 as a multiplication value obtained by multiplying the total number of subgroups $N_{sg}=16$ by the PO number $N_s=4$. Sixty-four bits in the bit map corresponds to subgroups #0 to #15 in PO #0, subgroups #0 to #15 in PO #1, subgroups #0 to #15 in PO #2, and subgroups #0 to #15 in PO #3. As such, corresponding bits in the bit map may be determined such that the indices of POs are determined first, and the indices of the subgroups are determined second.

For example, in FIG. 6, a single PO/subgroup indication field indicates that paging targets in PO #0 are subgroups #0 to #3, paging targets in PO #1 are subgroups #4 to #7, paging targets in PO #2 are subgroups #8 to #11, and paging targets in PO #3 are subgroups #12 to #15. As described above, since the terminal 10 belongs to subgroup #1, the terminal 10 monitors paging DCI in PO #0 in which subgroup #1 is included in the paging targets, but the terminal 10 may skip monitoring of paging DCI in POs #1 to #3 in which subgroup #1 is not included in the paging targets. Further, for example, the terminal 10 belonging to subgroup #1 decodes PDSCH in PO #0 but may not decode PDSCH in POs #1 to #3.

As illustrated in FIG. 6, in a case where the PO/subgroup indication field as PEI is constituted by a bit map with the number of bits equal to a multiplication value obtained by multiplying the total number of subgroups $N_{sg}$ by the PO number $N_s$, when one or more subgroups in each of the plurality of POs are targeted for paging, the one or more subgroups targeted for paging can be specified easily.

Code Point

Figure 7:
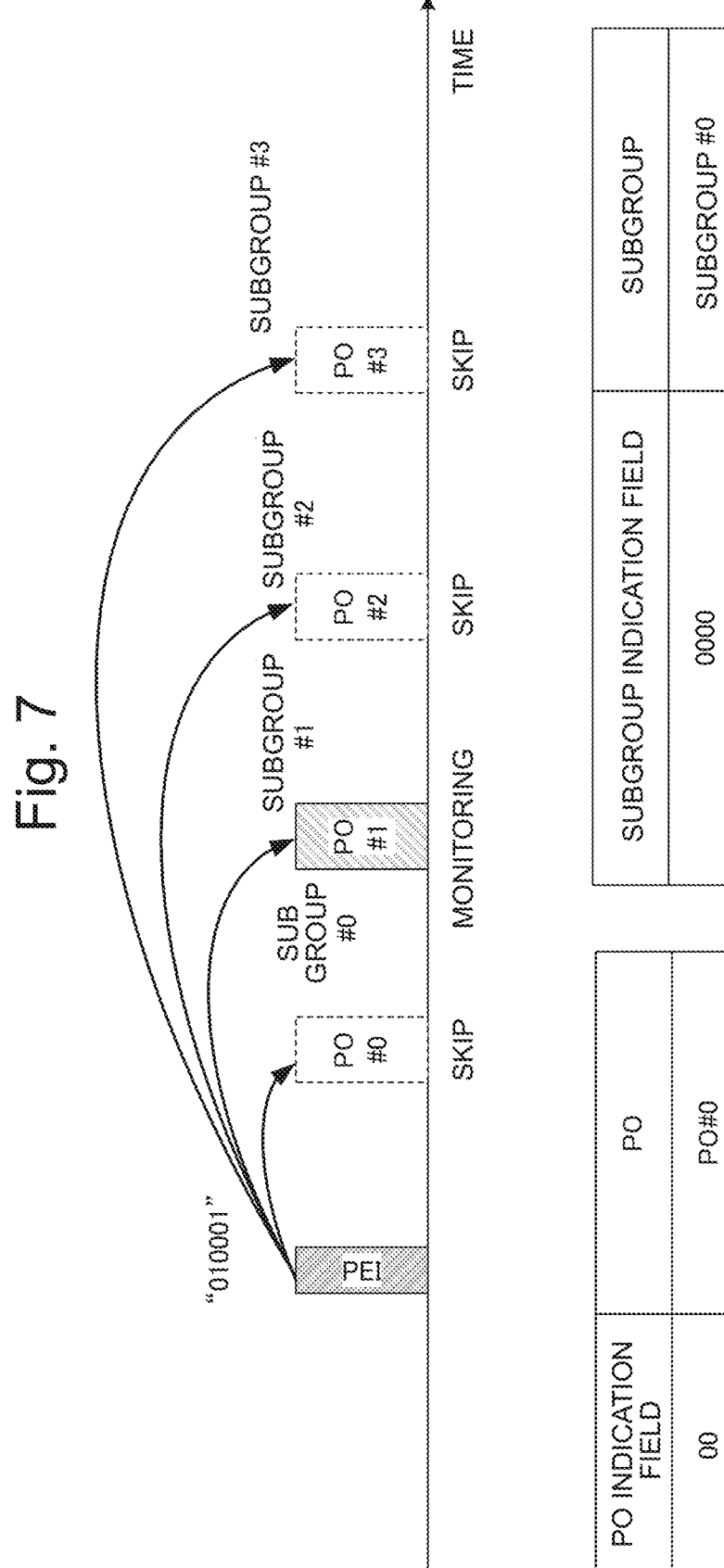
FIG. 7 is a diagram illustrating another example of the PEI according to the second aspect of the present embodiment.

FIG. 7 is a drawing illustrating another example of PEI according to the second aspect of the present embodiment. In terms of FIG. 7, the following mainly describes differences from FIG. 5 or 6. In FIG. 7, a subgroup indication field and a PO indication field may be included as PEI, instead of the PO/subgroup indication field. The subgroup indication field is the same as described with reference to FIG. 5. The PO indication field is constituted by a code point with the number of bits of two determined based on the PO number $N_s$=4. A PO associated with each code point may be determined in specifications in advance or may be informed to the terminal 10 by higher layer signaling. For example, in FIG. 7, code point "00" indicates PO #0, and "01," "10," and "11" indicate PO #1, PO #2, and PO #3, respectively.

Note that, in FIG. 7, each code point in the PO indication field indicates one PO, but each code point may indicate one or more POs determined in advance or informed by higher layer signaling. In a case where the PO indication field is constituted as a code point indicating one or more POs as such, the number of bits of the PO indication field may be indicated by ceil (log 2 (PO number $N_s$)), for example.

The PO indication field and the subgroup indication field may be defined as different fields in PEI or may be defined as a single PO/subgroup indication field in which the PO indication field is connected with the subgroup indication field. For example, in a bit value of six bits illustrated in FIG. 7, two bits from the left indicate a value of the PO indication field, and remaining four bits indicate a value of the subgroup indication field. Further, in FIG. 7, respective tables are provided for the PO indication field and the subgroup indication field, but a single table may be provided for the PO/subgroup indication field. In the single table, for example, a code point of six bits may be associated with information indicating which subgroup of which PO is targeted for paging.

For example, in FIG. 7, the PO/subgroup indication field (that is, the value of PEI) of six bits in a single DCI format indicates that only subgroup #1 of PO #1 is targeted for paging from among subgroups #0 to #15 in each of POs #0 to #3. As described above, since the terminal 10 belongs to subgroup #1, the terminal 10 monitors paging DCI in PO #1 in which subgroup #1 is included in the paging target, but the terminal 10 may skip monitoring of paging DCI in POs #0, #2, #3 in which subgroup #1 is not included in the paging target.

As illustrated in FIG. 7, in a case where the PO/subgroup indication field as PEI is constituted by a code point, the number of bits of the PO/subgroup indication field can be reduced, and overhead by PEI can be reduced in comparison with a case of the bit map illustrated in FIG. 6.

Note that, in FIGS. 6 and 7, a PEI monitoring occasion is provided before first PO #0 among the plurality of POs #0 to #3 associated with the same PF, but a PEI monitoring occasion may be provided in at least one of the plurality of POs. For example, a PEI monitoring occasion may be provided in a slot or a symbol before a PDCCH monitoring occasion in first PO #0, and monitoring of paging DCI in PDCCH monitoring occasions in POs #0 to #3 may be controlled based on respective PEIs detected in PO #0. Further, in FIGS. 6 and 7, POs #0 to #3 associated with the same PF are placed at regular intervals but are not limited to this, and at least two POs may be continuous with each other in terms of time. As such, FIGS. 6 and 7 are just examples, and the present invention is not limited to those illustrated herein. Further, although not illustrated herein, a DCI format including, as PEI, a plurality of subgroup indication fields corresponding to a plurality of POs, respectively, may be used. For example, in FIG. 7, 16 bits may be prepared as PEI corresponding to POs #0 to #3, and subgroups targeted for paging in POs #0 to #3 may be specified by four subgroup indication fields as the PEI.

In the second aspect, since the number of bits of the PO/subgroup indication field (or the PO indication field and the subgroup indication field) is determined appropriately based on the total number of subgroups $N_{sg}$ and the PO number $N_s$, monitoring in a PEI monitoring occasion can be performed appropriately. Further, since a subgroup targeted for paging in a plurality of POs can be specified by use of DCI-based PEI corresponding to the plurality of POs, the PEI monitoring occasion of the terminal 10 can be reduced in comparison with the first aspect.

Third Aspect

Next will be described a terminal operation in a PO as a third aspect of the present embodiment. Note that, in the first and second aspects, DCI-based PEI is assumed. However, herein, PEI should be information or a signal indicative of a subgroup targeted for paging in a PO, and PEI is not limited to DCI-based PEI and is also applicable to SSS-based PEI, TRS-based PEI, or the like.

As described in FIGS. 4 to 7, in a case where subgroups indicated by PEI include a subgroup assigned to the terminal 10, the terminal 10 performs monitoring of paging DCI in a PO and receives a paging message through PDSCH scheduled by use of the paging DCI. In the meantime, in a case where the subgroups indicated by PEI do not include the subgroup assigned to the terminal 10, the terminal 10 may skip monitoring of paging DCI in the PO. Due to the skip, wasteful power consumption in a PO untargeted for paging can be prevented.

In the meantime, paging DCI can be also used for transmission of a short message, as well as scheduling of PDSCH for transmitting a paging message. The short message is used for, for example, at least one of notification of modification of system information (for example, BCCH except SIB6, SIB7, and SIB8), ETWS primary notification, ETWS secondary notification, and CMAS notification.

Figures 8A, 8B, 8C:
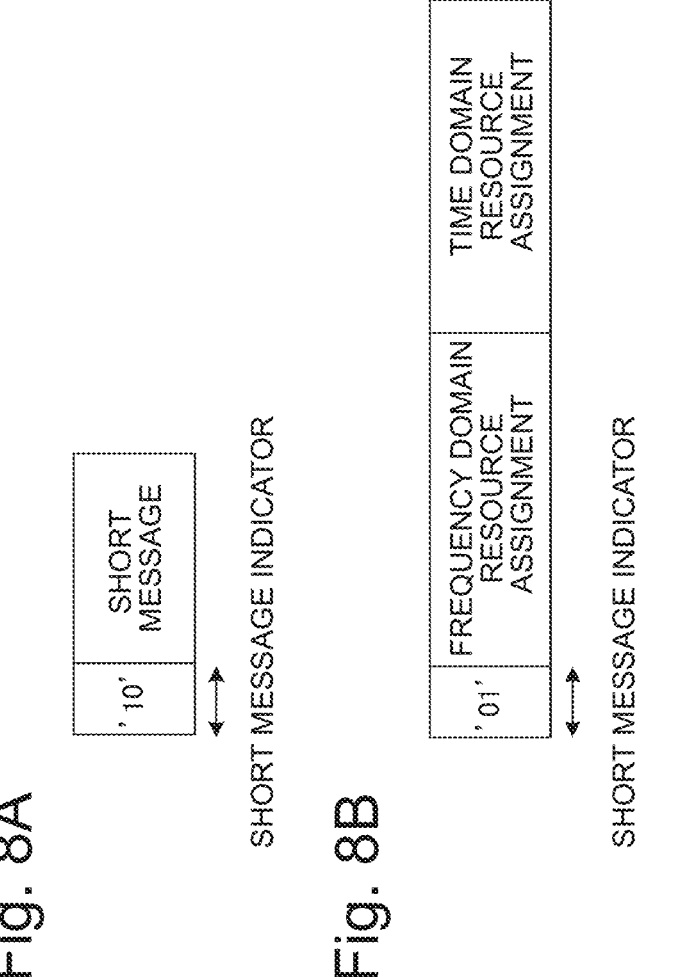
FIGS. 8A to 8C are diagrams each illustrating an example of paging DCI according to the present embodiment.

FIGS. 8A to 8C are drawings each illustrating an example of paging DCI according to the present embodiment. In FIG. 8, as paging DCI, DCI format 1_0 subjected to CRC scrambling by P-RNTI is assumed, but the paging DCI is not limited to this. As illustrated in FIGS. 8A to 8C, paging DCI includes a Short Message indicator.

As illustrated in FIG. 8A, a Short Message indicator "10" may indicate that only a short message is present in paging DCI. As illustrated in FIG. 8B, a Short Message indicator "01" may indicate that scheduling information (for example, frequency domain resource and time domain resource assignment information, and the like) for a paging message is present but no short message is present in paging DCI. As illustrated in FIG. 8C, a Short Message indicator "11" may indicate that both the scheduling information and the short message are present in paging DCI.

For example, a value "1" of the MSB in the short message in the paging DCI in FIGS. 8A and 8C may indicate a modification notification of the system information. Further, a value "1" of the second bit from the left in the short message may indicate at least one of an ETWS primary notification, an ETWS secondary notification, and a CMAS notification. Hereinafter, in a case where the paging DCI illustrated in FIG. 8A and the paging DCI including the scheduling information for paging as illustrated in FIGS. 8B and 8C are distinguished from each other, they are also referred to as "short message DCI" and "paging scheduling DCI," respectively.

As described above, when the terminal 10 skips monitoring of paging DCI in a PO in which the subgroup that the terminal 10 belongs to is untargeted for paging, electric power to be consumed by the terminal 10 can be saved. In the meantime, even in the PO, short message DCI (for example, FIG. 8A) to the terminal 10 is transmitted. Accordingly, when the terminal 10 skips monitoring of the paging DCI in the PO for power saving, the terminal 10 may not be able to receive the short message DCI, so that the terminal 10 may not be able to detect at least one of a modification notification of system information, ETWS, and CMAS.

In view of this, regardless of the subgroup indicated by PEI (that is, regardless of whether or not the subgroup to which the terminal 10 belongs is targeted for paging), the terminal 10 may continue monitoring of paging DCI illustrated in FIGS. 8A to 8C in each PO.

More specifically, in a case where subgroups indicated by PEI do not include the subgroup assigned to the terminal 10, or in a case where PEI is not received, the terminal 10 does not perform reception and/or decoding (hereinafter referred to as "reception/decoding") of PDSCH in a PO (the terminal 10 skips reception/decoding of PDSCH). In this case, the terminal 10 does not perform reception/decoding of PDSCH but receives/decodes a short message included in short message DCI (for example, FIG. 8A) detected by PDCCH monitoring in the PO.

Further, in a case where subgroups indicated by PEI do not include the subgroup assigned to the terminal 10 or in a case where PEI is not received, even when the terminal 10 detects paging scheduling DCI (for example, FIG. 8B or 8C) based on PDCCH monitoring in a PO, the terminal 10 may not perform reception/decoding of PDSCH. That is, in a case where the terminal 10 detects paging scheduling DCI based on PDCCH monitoring in a PO, the terminal 10 may perform only reception/decoding of a short message and may not perform reception/decoding of PDSCH. That is, in a case where the terminal 10 detects paging scheduling DCI based on PDCCH monitoring in a PO, the terminal 10 may disregard (skip) scheduling information (that is, scheduling information for paging) included in the paging scheduling DCI. That is, in a case where the terminal 10 detects paging scheduling DCI, the terminal 10 may perform only reception/decoding of a short message in the paging scheduling DCI.

As described above, in subgrouping, a plurality of terminals is divided into subgroups, and paging is performed per subgroup unit. Here, the plurality of terminals can include a terminal not supporting PEI (for example, a terminal corresponding to a release before NR Release 17, a terminal that does not have an ability to deal with PEI, and the like). In a given PO, the base station 20 transmits paging scheduling DCI including scheduling information for a terminal not supporting PEI and performs scheduling of PDSCH. In the meantime, in the given PO, a terminal (that is, the terminal 10) supporting PEI detects the paging scheduling DCI including the scheduling information for the terminal not supporting PEI. That is, the scheduling information included in the paging scheduling DCI transmitted in the given PO is for the terminal not supporting PEI, and the terminal (that is, the terminal 10) supporting PEI may disregard the scheduling information.

Thus, in a case where the terminal 10 detects paging scheduling DCI, the terminal 10 performs only reception/decoding of a short message and does not perform reception/ decoding of PDSCH. This allows the terminal not supporting PEI and the terminal supporting PEI to coexist (to be scheduled) in the same PO. Further, this allows the terminal not supporting PEI to perform reception/decoding of PDSCH and the terminal supporting PEI to disregard reception/decoding of PDSCH, so that effective scheduling is achievable. Further, the terminal supporting PEI is allowed to perform reception/decoding of a short message, thereby making it possible to notify modification of system information or to notify ETWS or CMAS.

In the meantime, in a case where subgroups indicated by PEI includes the subgroup assigned to the terminal 10, the terminal 10 performs reception/decoding of PDSCH in a PO (that is, receives/decodes a paging message transmitted through PDSCH). This is because, in the PO in which the subgroup that the terminal 10 belongs to is targeted for paging, paging scheduling DCI (for example, FIG. 8B or 8C) is detected.

As described above, regardless of whether or not a paging message to the subgroup to which the terminal 10 belongs to is transmitted in a PO, the terminal 10 performs PDCCH monitoring (for example, monitoring of the paging DCI illustrated in FIGS. 8A to 8C) in the PO.

Note that, in a case where the terminal 10 receives configuration information (for example, the subgroups total number information) related to reception of PEI, the terminal 10 may perform monitoring of the PEI. In a case where the terminal 10 does not receive the configuration information, the terminal 10 may determine that subgrouping is not performed, and the terminal 10 may perform PDCCH monitoring in each configured PO without monitoring PEI and perform reception/decoding of a paging message based on detected paging DCI. Further, the terminal 10 may receive the configuration information by higher layer signaling.

Figure 9:
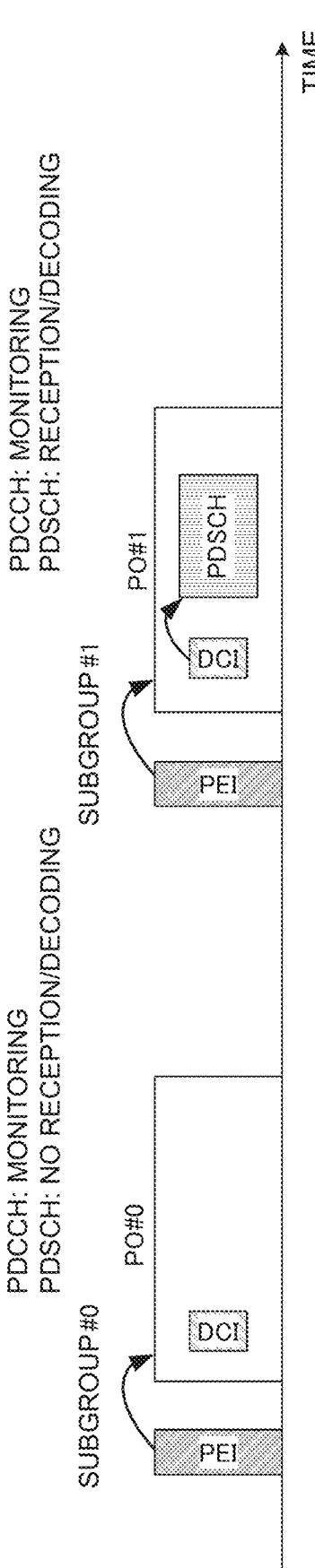
FIG. 9 is a diagram illustrating an example of a terminal operation in a PO according to a third aspect of the present embodiment.

FIG. 9 is a diagram illustrating an example of the terminal operation in a PO according to the third aspect of the present embodiment. In FIG. 9, the PEI described in the first aspect is assumed, but PEI is not limited to this as described above. For example, in FIG. 9, PEI indicates that a paging target in PO #0 is subgroup #0, and a paging target in PO #1 is subgroup #1. Further, the terminal 10 belongs to subgroup #1. In terms of FIG. 9, the following mainly describes differences from FIGS. 4 to 7.

As illustrated in FIG. 9, the terminal 10 continues PDCCH monitoring in each PO regardless of which subgroup is targeted for paging in each PO. For example, even in PO #0 where subgroup #1 the terminal 10 belongs to is untargeted for paging, the terminal 10 performs PDCCH monitoring, detects short message DCI (for example, FIG. 8A), and receives a short message. In PO #0, subgroup #1 is not targeted for paging, and therefore, paging scheduling DCI (for example, FIG. 8B or 8C) is not transmitted and detected. Accordingly, in PO #0, the terminal 10 does not perform reception/decoding of a paging message.

In the meantime, in PO #1 in which subgroup #1 the terminal 10 belongs to is targeted for paging, paging scheduling DCI (for example, FIG. 8B or 8C) is transmitted. The terminal 10 detects the paging scheduling DCI by PDCCH monitoring in PO #1 and performs reception/decoding of a paging message through PDSCH scheduled by the paging scheduling DCI.

Note that, in PO #1, short message DCI (for example, FIG. 8A) to the terminal 10 can be also transmitted. In a case where the terminal 10 detects the short message DCI by PDCCH monitoring in PO #1, the terminal 10 may receive a short message included in the short message DCI.

In FIG. 9, PDCCH monitoring is also continued in a PO in which the subgroup that the terminal 10 belongs to is untargeted for paging, and therefore, in a case where paging DCI (for example, DCI format 1_0 subjected to CRC scrambling by P-RNTI) is used in common for a short message and for scheduling, the terminal 10 can receive a short message in the PO.

Fourth Aspect

Next will be described a subgroup deriving operation as a fourth aspect of the present embodiment. Note that the first to third aspects are applicable to a case where subgrouping is performed on the basis of either of the terminal identifier and the network. Here, an operation to derive the subgroup to which the terminal 10 belongs in a case where network-based subgrouping is performed will be described. Further, PEI should be information or a signal indicative of a subgroup targeted for paging in a PO, and PEI is not limited to DCI-based PEI and is also applicable to SSS-based PEI, TRS-based PEI, or the like. Note that the fourth aspect can be combined with the first or second aspect and/or the third aspect.

The configuration of subgroups (for example, the total number of subgroups $N_{sg}$ or the like) is determined per given unit (for example, a cell, a tracking area, a RAN area, or the like) in consideration of various factors such as a paging strategy or a loading state, for example, and it is also assumed that subgroups of different units have different configurations. For example, it is assumed that the total number of subgroups $N_{sg}$ of a cell A is two while the total number of subgroups $N_{sg}$ of a cell B is four.

In a case where subgroups of different units have different configurations as such, the subgroup assigned to the terminal 10 from the network can vary between the different units. For example, it is assumed that the terminal 10 belongs to subgroup #1 in the cell A in which the total number of subgroups $N_{sg}$ is 2, while the terminal 10 belongs to subgroup #0 in the cell B in which the total number of subgroups $N_{sg}$ is 4. In this case, due to movement between the different units (for example, between the cell A and the cell B), the subgroups assigned to the terminal 10 might become inconsistent.

In view of this, in a fourth PO-related operation, a CN device (for example, AMF) may assign, to the terminal 10, respective subgroups for a plurality of total number of subgroups $N_{sg}$ and inform the terminal 10 of information (hereinafter referred to as "subgroup set information") about a set of the assigned subgroups. For example, in a registration procedure to the CN device, the terminal 10 may receive the subgroup set information by NAS signaling. Note that the assignment of a subgroup for each total number of subgroups $N_{sg}$ may be performed by the RAN (for example, the base station 20), and the terminal 10 may receive the subgroup set information by RRC signaling.

FIG. 10 is a drawing illustrating an example of the subgroup set information according to the fourth aspect of the present embodiment. As illustrated in FIG. 10, in the subgroup set information, a total number of subgroups $N_{sg}$ may be associated with information (for example, a subgroup ID) about a subgroup assigned to the terminal 10 in the total number of subgroups $N_{sg}$. For example, in FIG. 10, a subgroup ID assigned to the terminal 10 in each total number of subgroups $N_{sg}$ of 2, 3, 4, . . . , 16 is illustrated.

The CN device may determine a subgroup to which the terminal 10 belongs for each total number of subgroups $N_{sg}$ from among $N_{sg}$ pieces of subgroups #0 to #$N_{sg}$−1 at the maximum, based on at least one of the performance of the terminal 10, the load of the network, a paging strategy, and the number of terminals 10 assigned to the same PF.

The terminal 10 derives the subgroup to which the terminal 10 belongs in a camp-on cell based on the subgroup set information and the subgroups total number information.

Figure 11:
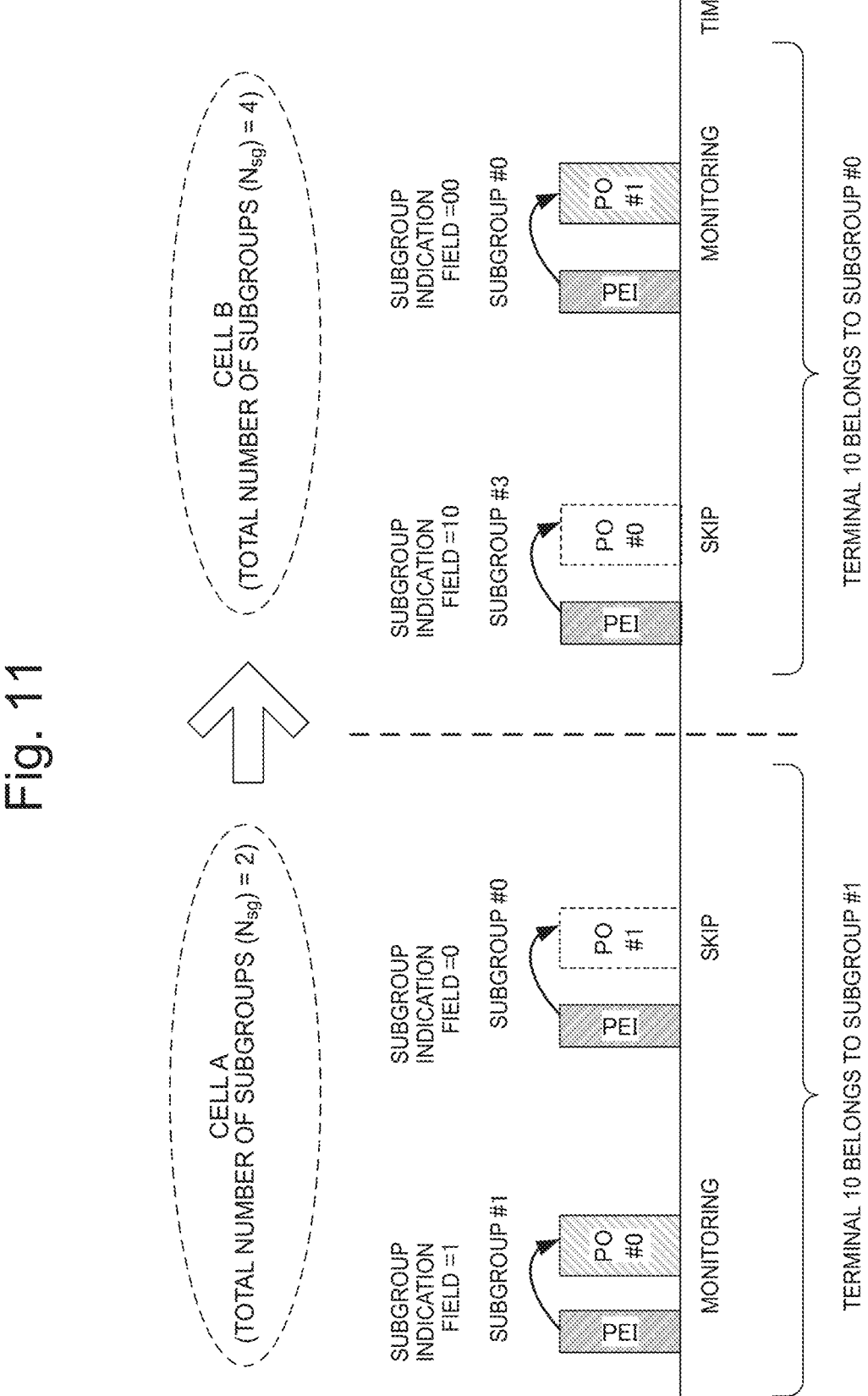
FIG. 11 is a drawing illustrating an example of a subgroup deriving operation according to a fourth aspect of the present embodiment.

FIG. 11 is a drawing illustrating an example of a subgroup deriving operation according to the fourth aspect of the present embodiment. In FIG. 11, the terminal 10 receives the subgroup set information illustrated in FIG. 10. Further, in FIG. 11, PEI (for example, FIG. 5) including a subgroup indication field constituted by a code point is assumed, but PEI is not limited to this as described above. In terms of FIG. 11, the following mainly describes differences from FIGS. 4 to 7.

For example, FIG. 11, the terminal 10 moves from the cell A to the cell B. In the cell A, the total number of subgroups $N_{sg}$ is two, and the subgroup indication field in PEI has one bit. Here, subgroup indication field values "0" and "1" indicate subgroups #0 and #1, respectively. In the meantime, in the cell B, the total number of subgroups $N_{sg}$ is four, and the subgroup indication field in PEI has two bits. Here, subgroup indication field values "00," "01," "10," and "11" indicate subgroups #0, #1, #2, and #3, respectively.

In FIG. 11, since the total number of subgroups $N_{sg}$ in the cell A is two, and subgroup #1 is associated with the total number of subgroups $N_{sg}$=2 in FIG. 10, the terminal 10 determines that the terminal 10 belongs to subgroup #1 in the cell A. In the meantime, since the total number of subgroups $N_{sg}$ in the cell B is four, and subgroup #0 is associated with the total number of subgroups $N_{sg}$=4 in FIG. 10, the terminal 10 determines that the terminal 10 belongs to subgroup #0 in the cell B.

As illustrated in FIG. 11, in a case where the terminal 10 camps on the cell A, PEI indicates that a paging target in PO #0 is subgroup #1, and a paging target in PO #1 is subgroup #0. As described above, since the terminal 10 belongs to subgroup #1 in the cell A, the terminal 10 performs monitoring of paging DCI in PO #0, but the terminal 10 may skip monitoring of paging DCI in PO #1. Note that, although not illustrated herein, it is needless to say that the terminal 10 may continue monitoring of paging DCI in PO #1 and receive a short message.

Further, in a case where the terminal 10 camps on the cell B, PEI indicates that a paging target in PO #0 is subgroup #3, and a paging target in PO #1 is subgroup #0. As described above, since the terminal 10 belongs to subgroup #0 in the cell B, the terminal 10 skips monitoring of paging DCI in PO #0, but the terminal 10 may monitor paging DCI in PO #1. Note that, although not illustrated herein, it is needless to say that the terminal 10 may continue monitoring of paging DCI in PO #0 and receive a short message.

FIG. 12 is a drawing illustrating an example of specification changes about subgroups total number information in the present embodiment. As described above, the subgroups total number information is informed to the terminal 10 by higher layer signaling. FIG. 12 illustrates an example in which the subgroups total number information is included in SIB1, but it is needless to say that the subgroups total number information is not limited to this.

As illustrated in FIG. 12, the subgroups total number information (for example, RRC IE "nrofPagingSubGroup") may be included in RRC IE "DownlinkConfigCommonSIB" in RRC IE "ServingCellConfigCommonSIB" of SIB1. The subgroups total number information specifies the total number of subgroups $N_{sg}$ supported in a cell C with values from 2 to 16.

For example, in a case where subgroups total number information (for example, RRC IE "nrofPagingSubGroup") is present in SIB1 and the terminal 10 supports a paging subgroup, the terminal 10 may set a value (that is, the subgroup in FIG. 10) corresponding to the total number of subgroups $N_{sg}$ indicated by the subgroups total number information (for example, RRC IE "nrofPagingSubGroup") such that the value is given in a higher layer (for example, NAS defined by TS24.501) as a subgroup assigned to the terminal 10.

Hereby, as illustrated in FIG. 11, even in a case where the terminal 10 moves between cells having different total number of subgroups $N_{sg}$, the terminal 10 can derive the subgroup assigned to the terminal 10 itself.

Configuration of Wireless Communication System

Next will be described the configuration of each equipment in the wireless communication system 1. Note that the following configurations are intended to describe a necessary configuration in the description of the present embodiment and do not exclude each equipment from including a functional block other than those illustrated herein.

Hardware Configuration

Figure 13:
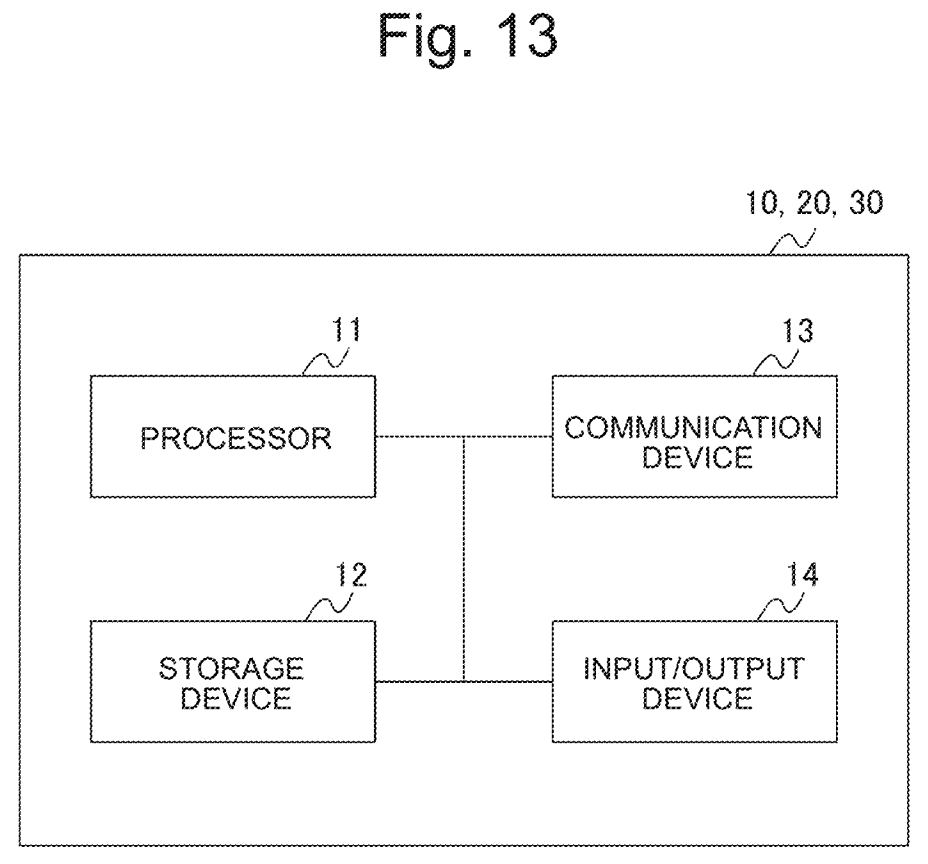

FIG. 13 is a diagram illustrating an example of the hardware configuration of each equipment in the wireless communication system according to the present embodiment. Each equipment in the wireless communication system 1 (for example, the terminal 10, the base station 20, the CN 30, or the like) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 and execute the program to perform various processing to be described in the present embodiment. Each equipment in the wireless communication system 1 may also be configured to include one or more processors 11. Further, each equipment concerned may also be called a computer.

The storage device 12 is constituted by, for example, storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks and may include a network card, a communication module, a chip, an antenna, and the like, for example. Further, an amplifier, an RF (Radio Frequency) device for performing processing on radio signals, and a BB (Base Band) device for performing processing on baseband signals may be included in the communication device 13.

The RF device performs D/A conversion, modulation, frequency conversion, power amplification, and the like on a digital baseband signal received from the BB device, for example, to generate a radio signal to be transmitted from an antenna A. Further, the RF device performs frequency conversion, demodulation, A/D conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse, and/or a microphone, and output devices such as a display and/or a speaker, for example.

Note that the hardware configuration described above is just an example. In each equipment inside the wireless communication system 1, part of the hardware illustrated in FIG. 13 may be omitted, or any other hardware unillustrated in FIG. 13 may be included. Further, the hardware illustrated in FIG. 13 may be constituted by one or more chips.

Functional Block Configuration

Terminal

Figure 14:
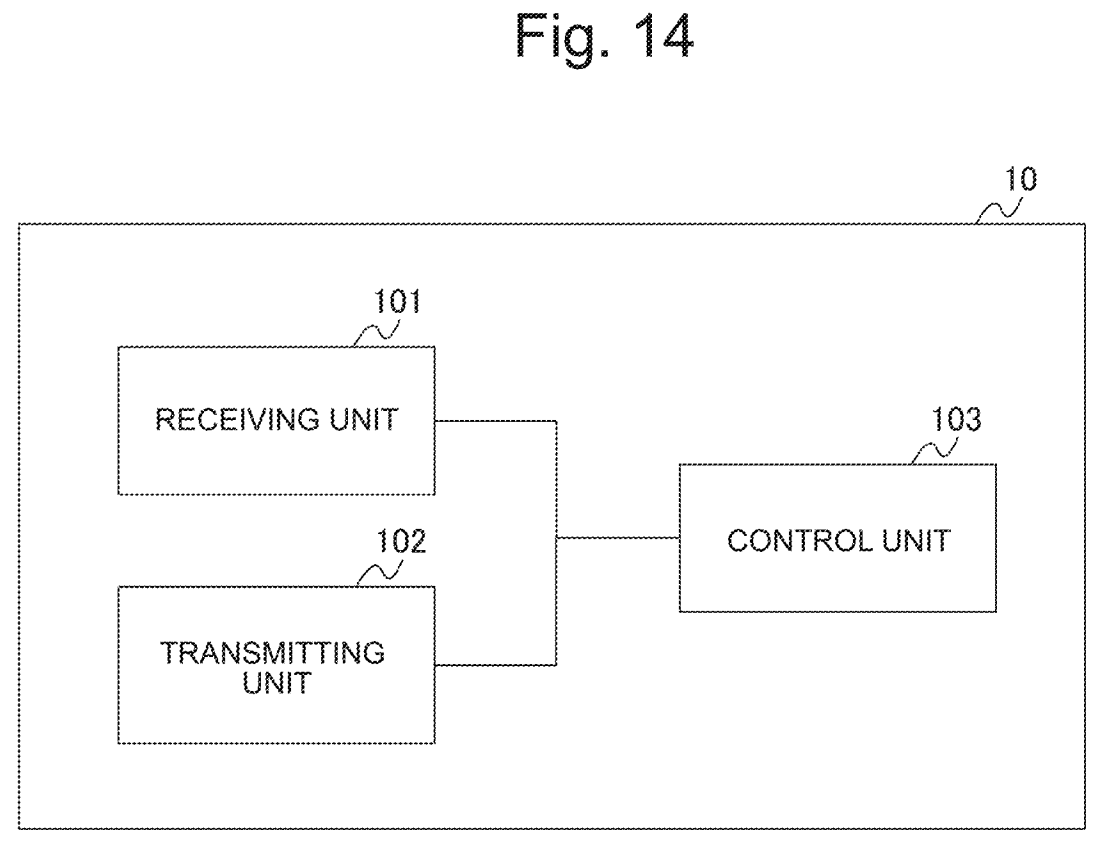

FIG. 14 is a diagram illustrating an example of the functional block configuration of the terminal according to the present embodiment. As illustrated in FIG. 14, the terminal 10 includes a receiving unit 101, a transmitting unit 102, and a control unit 103.

All or some of the functions implemented by the receiving unit 101 and the transmitting unit 102 can be achieved by use of the communication device 13. Further, all or some of the functions implemented by the receiving unit 101 and the transmitting unit 102, and the control unit 103 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 101 receives downlink signals. Further, the receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal. The downlink signal may include, for example, at least one of PDCCH, PDSCH, a downlink reference signal, the synchronization signal, PBCH, and so on.

The receiving unit 101 monitors PDCCH candidates in a search space and detects DCI. The receiving unit 101 may receive downlink user data and/or control information (for example, Medium Access Control Element (MAC CE), an RRC message, a NAS message, or the like) on a higher layer through PDSCH scheduled by the DCI.

More specifically, the receiving unit 101 may receive system information (for example, SIB1 or the like). Further, the receiving unit 101 may receive information (for example, the subgroups total number information) about the total number of subgroups. For example, the receiving unit 101 receives information about the total number of subgroups by higher layer signaling. Further, the receiving unit 101 may receive information (for example, the PO number information) about the number of a plurality of paging periods. For example, the receiving unit 101 may receive information about the number of the plurality of paging periods by higher layer signaling. The higher layer signaling is, for example, NAS signaling, system information, or RRC signaling.

Further, the receiving unit 101 may receive downlink control information including a field (for example, the subgroup indication field as PEI) indicating a subgroup targeted for paging in a paging period (for example, a PO) (the first aspect, for example, FIGS. 4 and 5).

Further, the receiving unit 101 may receive downlink control information including a field (for example, the PO/subgroup indication field, or the PO indication field and the subgroup indication field, as PEI) indicating subgroups targeted for paging in a plurality of paging periods (for example, a plurality of POs) (the second aspect, for example, FIGS. 6 and 7).

The receiving unit 101 may receive downlink control information (for example, paging DCI) monitored in a paging period and receive a paging message through a downlink shared channel scheduled by use of the downlink control information.

The receiving unit 101 may receive information indicative of the subgroup assigned to the terminal 10 by the network (network-based subgrouping).

The receiving unit 101 receives configuration information about reception of information or a signal (for example, PEI) indicative of a subgroup targeted for paging in a paging period. The configuration information may be, for example, the subgroups total number information.

The receiving unit 101 may receive information or a signal (for example, PEI) indicative of a subgroup targeted for paging in a paging period.

In a case where the subgroup indicated by the information or signal (for example, PEI) indicative of a subgroup targeted for paging in a paging period does not include the subgroup assigned to the terminal 10, the receiving unit 101 may not perform reception and/or decoding of a downlink shared channel (for example, FIG. 9). In a case where the receiving unit 101 does not receive the information or the signal, the receiving unit may not perform reception and/or decoding of the downlink shared channel. The receiving unit 101 may receive a short message included in the downlink control information detected in the paging period without performing reception and/or decoding of the downlink shared channel.

In a case where the subgroup indicated by the information or signal (for example, PEI) indicative of a subgroup targeted for paging in a paging period includes the subgroup assigned to the terminal 10, the receiving unit 101 may perform reception and/or decoding of a downlink shared channel based on the downlink control information detected in the paging period (for example, FIG. 9).

The receiving unit 101 receives information (for example, the subgroup set information in FIG. 10) about a set of respective subgroups assigned to the terminal 10 in a plurality of total number of subgroups, and information (for example, the subgroups total number information) about a total number of subgroups for a given unit. The predetermined unit may be, for example, a cell that the terminal 10 camps on, a tracking area to which the terminal 10 belongs, or an RAN area to which the terminal 10 belongs. The receiving unit 101 may receive information about the set of subgroups by NAS signaling and receive information about the total number of subgroups by the NAS signaling, system information, or RRC signaling.

The transmitting unit 102 transmits uplink signals. Further, the transmitting unit 102 may also transmit information and/or data to be transmitted through each uplink signal. Here, for example, the verb "transmit" may also include the meaning of performing processing related to transmission including at least one of encoding, modulation, mapping, and transmission of a radio signal. The uplink signals may include, for example, at least one of an uplink shared channel (e.g., a Physical Uplink Shared channel: PUSCH), a random access preamble (e.g., a Physical Random Access Channel (PRACH)), an uplink reference signal, and so on.

The transmitting unit 102 may transmit uplink user data and/or control information (for example, MAC CE, an RRC message, and the like) on a higher layer through PUSCH scheduled by use of DCI received by the receiving unit 101.

The control unit 103 performs various controls in the terminal 10.

For example, based on the value of the field in the downlink control information, the control unit 103 controls execution of monitoring in a paging period (for example, execution of monitoring in the paging period in the first operation and/or the second operation related to PEI) (the first aspect). Further, the control unit 103 may determine the number of bits of the field in the downlink control information based on information about the total number of subgroups. The field may be constituted by a bit map with the number of bits equal to the total number of subgroups (for example, FIG. 4). The field may be constituted by a code point with the number of bits determined based on the total number of subgroups (for example, FIG. 5).

In a case where a subgroup indicated by the value of the field in the downlink control information does not include the subgroup assigned to the terminal 10, the control unit 103 may skip execution of the monitoring in the paging period (for example, monitoring of paging DCI and/or reception/decoding of PDSCH) (for example, FIGS. 4 and 5).

In a case where the subgroup indicated by the value of the field in the downlink control information includes the subgroup assigned to the terminal 10, the control unit 103 may perform the monitoring in the paging period (for example, monitoring of paging DCI and/or reception/decoding of PDSCH) (for example, FIGS. 4 and 5).

Based on the value of the field in the downlink control information, the control unit 103 controls execution of monitoring in a plurality of paging periods (for example, execution of monitoring in the paging periods in the first operation and/or the second operation related to PEI) (the second aspect). Further, the control unit 103 may determine the number of bits of the field in the downlink control information based on information about the total number of subgroups and information about the number of the plurality of periods. The field may be constituted by a bit map with the number of bits equal to a multiplication value obtained by multiplying the total number of subgroups by the number of the plurality of paging periods (for example, FIG. 6). The field may include a first field of the number of bits determined based on the total number of subgroups and a second field of the number of bits determined based on the number of the plurality of periods (for example, FIG. 7). The field may be constituted in combination of a code point with the number of bits determined based on the total number of subgroups and a code point of the number of bits determined based on the number of the plurality of periods (for example, FIG. 7).

In a case where the subgroup in at least one of the plurality of paging periods indicated by the value of the field in the downlink control information does not include the subgroup assigned to the terminal 10, the control unit 103 may skip execution of the monitoring in the paging period (for example, monitoring of paging DCI and/or reception/decoding of PDSCH) (for example, FIGS. 6 and 7).

In a case where the subgroup in at least one of the plurality of periods indicated by the value of the field in the downlink control information includes the subgroup assigned to the terminal, the control unit 103 may perform the monitoring in the paging period (for example, monitoring of paging DCI and/or reception/decoding of PDSCH) (for example, FIGS. 6 and 7).

The control unit 103 may derive the subgroup assigned to the terminal 10 based on the terminal identifier (for example, 5G-S-TMSI) assigned to the terminal 10 and the total number of subgroups (terminal-identifier-based subgrouping).

The control unit 103 may control reception of information or a signal (for example, PEI) indicative of a subgroup targeted for paging in a paging period. Further, regardless of the subgroup indicated by the information or the signal, the control unit 103 may perform monitoring of downlink control information (for example, paging DCI) in which CRC bits are scrambled by specific RNTI in the paging period (the third aspect).

The control unit 103 derives the subgroup to which the terminal 10 belongs per given unit, based on information about the set of subgroups and information about the total number of subgroups (the fourth aspect).

In a case where the receiving unit 101 receives information or a signal (for example, PEI) indicative of a subgroup targeted for paging in a paging period, the control unit 103 may control monitoring of downlink control information (for example, paging DCI) in the paging period based on the subgroup indicated by the information or the signal and the subgroup thus derived (the fourth aspect). In a case where the subgroup indicated by the information or the signal does not include the subgroup thus derived, the control unit 103 may skip monitoring of the downlink control information in the paging period (for example, FIG. 11). In a case where the subgroup indicated by the information or the signal includes the subgroup thus derived, the control unit 103 may perform monitoring of the downlink control information in the paging period (for example, FIG. 11). The control unit 103 may perform monitoring of the downlink control information in the paging period regardless of the subgroup indicated by the information or the signal.

Base Station

Figure 15:
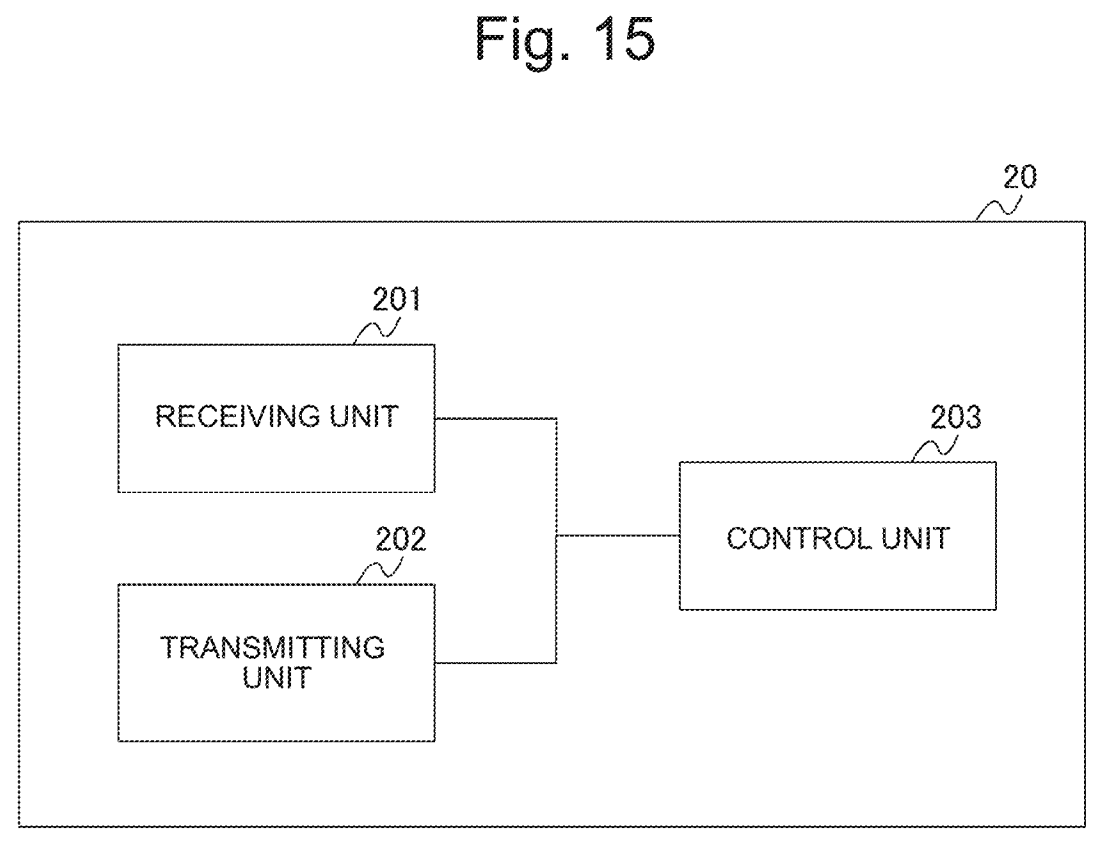

FIG. 15 is a diagram illustrating an example of the functional block configuration of the base station according to the present embodiment. As illustrated in FIG. 15, the base station 20 includes a receiving unit 201, a transmitting unit 202, and a control unit 203.

All or some of the functions implemented by the receiving unit 201 and the transmitting unit 202 can be achieved by use of the communication device 13. Further, all or some of the functions implemented by the receiving unit 201 and the transmitting unit 202, and the control unit 203 can be achieved by the processor 11 executing a program stored in the storage device 12. Further, the program can be stored in a storage medium. The storage medium in which the program is stored may be a non-transitory computer readable medium. The non-transitory medium is not limited particularly but may be a storage medium such as a USB memory or a CD-ROM, for example.

The receiving unit 201 receives the above-mentioned uplink signals. Further, the receiving unit 201 may also receive information and/or data transmitted through each of the above-mentioned uplink signals.

The transmitting unit 202 transmits the above-mentioned downlink signals. Further, the transmitting unit 202 may also transmit information and/or data to be transmitted through each of the above-mentioned downlink signals. More specifically, the transmitting unit 202 may transmit system information (for example, SIB1). Further, the transmitting unit 202 may transmit information about the total number of subgroups (for example, the subgroups total number information). Further, the transmitting unit 202 may transmit information about the number of a plurality of paging periods (for example, the PO number information).

Further, the transmitting unit 202 may transmit downlink control information including a field (for example, the subgroup indication field as PEI) indicative of a subgroup targeted for paging in a paging period (for example, a PO) (the first aspect, for example, FIGS. 4 and 5).

Further, the transmitting unit 202 may transmit downlink control information including a field (for example, the PO/subgroup indication field, or the PO indication field and the subgroup indication field, as PEI) indicative of respective subgroups targeted for paging in a plurality of paging periods (for example, a plurality of POs) (the second aspect, for example, FIGS. 6 and 7).

The transmitting unit 202 may transmit downlink control information (for example, paging DCI) monitored in a paging period and transmit a paging message through a downlink shared channel scheduled by use of the downlink control information.

The transmitting unit 202 may transmit information indicative of the subgroup assigned to the terminal 10 by the network (network-based subgrouping).

The transmitting unit 202 transmits configuration information related to reception of information or a signal (for example, PEI) indicative of a subgroup targeted for paging in a paging period. The configuration information may be, for example, the subgroups total number information.

The transmitting unit 202 may transmit information or a signal (for example, PEI) indicative of a subgroup targeted for paging in a paging period.

The transmitting unit 202 may transmit information (for example, the subgroup set information in FIG. 10) about a set of respective subgroups assigned to the terminal 10 in a plurality of total number of subgroups, and information (for example, the subgroups total number information) about a total number of subgroups for a given unit.

The control unit 203 performs various controls in the base station 20. Note that a transmitting unit in a device on the core network 30 may transmit some information transmitted from the transmitting unit 202 of the base station.

Other Embodiment

Various signals, information, and parameters in the aforementioned embodiment may be signaled in any layer. In other words, the various signals, information, and parameters mentioned above may be also replaced with signals, information, and parameters in any layer such as the higher layer (for example, a Non Access Stratum (NAS) layer, an RRC layer, a MAC layer, or the like) or the lower layer (for example, a physical layer). Further, given information is not limited to be explicitly informed and may also be implicitly informed (for example, by not informing the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers. Further, "first . . . " or "second . . . " is just to discriminate a plurality of pieces of information or signals from each other, and the order of the plurality of pieces of information or signals may be replaced appropriately.

Further, the applications of the terminal 10 in the aforementioned embodiment (for example, for RedCap, IoT, and the like) are not limited to those described herein, and the terminal 10 may also be used for any other purpose (for example, for eMBB, URLLC, Device-to-Device (D2D), Vehicle-to-Everything (V2X), or the like) as long as it has similar functions. Further, the format of various information is not limited to that in the aforementioned embodiment, and it may be changed accordingly such as to bit representation (0 or 1), Boolean (true or false), integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indexes, conditions, and the like included in the embodiment are not limited to those described and can be changed accordingly. Further, at least some of components described in the aforementioned embodiment can be partially replaced or combined.

The invention claimed is:

1. A terminal comprising:

a memory storing instructions; and one or more processors configured to execute the instructions to:

receive, from a core network device, an identifier of a subgroup of a paging occasion to which the terminal belongs;

receive, from a base station, system information including information for indicating a total number of subgroups of the paging occasion and information for indicating a number of paging occasions corresponding to one Paging Early Indication (PEI) monitoring occasion;

perform monitoring of a physical downlink control channel (PDCCH) for first downlink control information (DCI) including a field of a PEI in the PEI monitoring occasion;

perform monitoring of a PDCCH for second DCI in the paging occasion in a case where a value of the PEI indicates the subgroup of the paging occasion to which the terminal belongs; and perform no monitoring of the PDCCH for the second DCI in the paging occasion in a case where the PEI is not detected, or a value of the PEI does not indicate the subgroup of the paging occasion to which the terminal belongs, and a number of bits for the field of the PEI is determined based on the information for indicating the total number of subgroups of the paging occasion and the information for indicating the number of paging occasions corresponding to the one PEI monitoring occasion.

2. The terminal according to claim 1, wherein the one or more processors are further configured to:

receive, from the base station, the system information including an index of a search space set for the monitoring of the PDCCH for the first DCI and information for configuring the search space set for the monitoring of the PDCCH for the first DCI;

perform the monitoring of the PDCCH for the first DCI in a monitoring occasion corresponding to Remaining system information (RMSI) in a case where the index of the search space set is configured to be 0; and perform the monitoring of the PDCCH for the first DCI in a monitoring occasion based on the information for configuring the search space set in a case where the index of the search space set is configured to be other than 0.

3. A wireless communication method performed by a terminal comprising:

receiving, from a core network device, an identifier of a subgroup of a paging occasion to which the terminal belongs, receiving, from a base station, system information including information for indicating a total number of subgroups of the paging occasion and information for indicating a number of paging occasions corresponding to one PEI (Paging Early Indication) monitoring occasion, performing monitoring of a physical downlink control channel (PDCCH) for first downlink control information (DCI) including a field of a PEI in the PEI monitoring occasion, performing monitoring of a PDCCH for second DCI in the paging occasion in a case where a value of the PEI indicates the subgroup of the paging occasion to which the terminal belongs, and performing no monitoring of the PDCCH for the second DCI in the paging occasion in a case where the PEI is not detected, or a value of the PEI does not indicate the subgroup of the paging occasion to which the terminal belongs, wherein a number of bits for the field of the PEI is determined based on the information for indicating the total number of subgroups of the paging occasion and the information for indicating the number of paging occasions corresponding to the one PEI monitoring occasion.

4. The wireless communication method according to claim 3, further comprising:

receiving, from the base station, the system information including an index of a search space set for the monitoring of the PDCCH for the first DCI and information for configuring the search space for the monitoring of the PDCCH for the first DCI, performing the monitoring of the PDCCH for the first DCI in a monitoring occasion corresponding to Remaining system information (RMSI) in a case where the index of the search space set is configured to be 0, and performing the monitoring of the PDCCH for the first DCI in a monitoring occasion based on the information for configuring the search space set in a case where the index of the search space set is configured to be other than 0.

* * * * *